United States Patent
Funahashi et al.

(10) Patent No.: US 7,207,187 B2
(45) Date of Patent: Apr. 24, 2007

(54) INVERTER-INTEGRATED MOTOR FOR AN AUTOMOTIVE VEHICLE

(75) Inventors: Kenji Funahashi, Nagoya (JP); Ken Hamada, Kariya (JP); Hiroyuki Kawata, Chiryu (JP); Yasuyuki Ohkouchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/422,958

(22) Filed: Apr. 25, 2003

(65) Prior Publication Data

US 2003/0200761 A1 Oct. 30, 2003

(30) Foreign Application Priority Data

| Apr. 26, 2002 | (JP) | 2002-127299 |
| Apr. 26, 2002 | (JP) | 2002-127310 |
| Nov. 13, 2002 | (JP) | 2002-329764 |
| Dec. 9, 2002 | (JP) | 2002-357255 |

(51) Int. Cl.
- *F25D 25/00* (2006.01)
- *F25D 62/505* (2006.01)
- *F25D 62/113* (2006.01)
- *F25D 62/259* (2006.01)

(52) U.S. Cl. .................. 62/228.4; 62/505; 62/113; 62/259.2

(58) Field of Classification Search ......... 62/228.4, 62/505, 513, 113, 259.2; 417/410.1, 366, 417/367, 368

See application file for complete search history.

(56) References Cited

U.S. PATENT DOCUMENTS

| 6,041,609 A | 3/2000 | Hornsleth et al. |
| 6,198,183 B1 | 3/2001 | Baeumel et al. |
| 6,321,563 B1 | 11/2001 | Ikeda et al. |
| 6,354,846 B1 | 3/2002 | Murakami |
| 6,488,475 B2 | 12/2002 | Murata et al. |
| 6,560,984 B2 * | 5/2003 | Bellet .................. 62/259.2 |
| 6,564,576 B2 * | 5/2003 | Shibuya ................. 62/505 |
| 6,577,030 B2 | 6/2003 | Tominaga et al. |
| 6,599,104 B2 * | 7/2003 | Saito et al. .............. 417/366 |
| 6,619,933 B2 * | 9/2003 | Ikeda ................. 417/410.1 |
| 2001/0030362 A1 | 10/2001 | Grant |
| 2002/0062655 A1 | 5/2002 | Bellet |

FOREIGN PATENT DOCUMENTS

EP 0 604 028 A1 6/1994

(Continued)

OTHER PUBLICATIONS

Maekawa et al., "Miniaturization technique for Automotive Inverters", The Technical Report of Mitsubishi Electric Corporation, vol. 74, No. 9, 2000, pp. 31-34 (with abstract).

Nakatani et al., "New Composite Substrate with High Thermal Conductivity for Power Modules", Matsushita Technical Journal vol. 45, No. 4, Aug. 1999, pp. 413-420 (with abstract).

*Primary Examiner*—Marc Norman
*Assistant Examiner*—Gene L. Bankhead
(74) *Attorney, Agent, or Firm*—Oliff & Berridge, PLC

(57) ABSTRACT

A bus-bar integrated plate and outer frame section, arranged into a double-deck structure and having numerous bus bars molded with a resin molding plate portion, is provided as a wiring for connecting power switching elements and a smoothing capacitor, fixed on an outer surface of a cylindrical wall of a motor housing, to a printed circuit board serving as a control circuit.

18 Claims, 17 Drawing Sheets

FOREIGN PATENT DOCUMENTS

| | | |
|---|---|---|
| EP | 1 167 724 A1 | 1/2002 |
| EP | 1 178 584 A2 | 2/2002 |
| JP | A-UM-62-012471 A | 1/1987 |
| JP | U 62-12471 | 1/1987 |
| JP | A 2-4163 | 1/1990 |
| JP | A 4-80554 | 3/1992 |
| JP | U-4-65492 | 6/1992 |
| JP | A-7-99750 | 4/1995 |
| JP | A-8-289505 | 11/1996 |
| JP | A-8-289566 A | 11/1996 |
| JP | A-10-201168 | 7/1998 |
| JP | A-10-304679 | 11/1998 |
| JP | A 11-17071 | 1/1999 |
| JP | A-11-346454 | 12/1999 |
| JP | A-11-356006 | 12/1999 |
| JP | A 2000-92847 | 3/2000 |
| JP | B2 3086819 | 7/2000 |
| JP | A 2000-291557 | 10/2000 |
| JP | A-2001-35562 | 2/2001 |
| JP | A-2001-128417 | 5/2001 |
| JP | A 2001-237369 | 8/2001 |
| JP | A 2002-5024 | 1/2002 |
| JP | A-2002-21794 | 1/2002 |
| JP | A-2002-70743 A | 3/2002 |
| JP | A-2002-118926 | 4/2002 |
| JP | A-2002-120739 | 4/2002 |
| JP | A 2002-206481 | 7/2002 |
| JP | A-2002-320392 | 10/2002 |
| JP | A 2002-320392 | 10/2002 |

\* cited by examiner

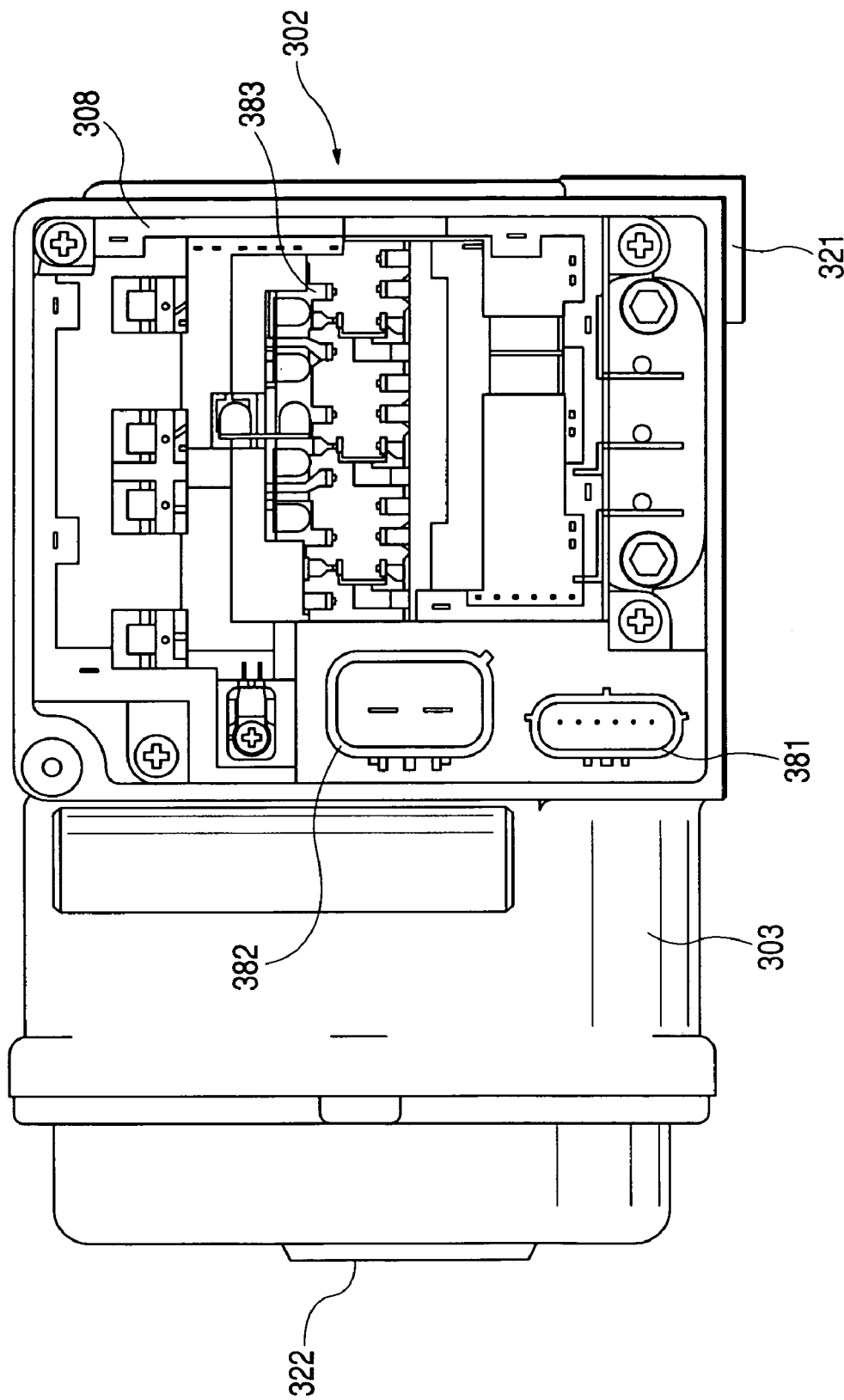

INVERTER-INTEGRATED MOTOR FOR AN AUTOMOTIVE VEHICLE

BACKGROUND OF THE INVENTION

1. Field of the Invention

The present invention relates to an inverter-integrated motor for an automotive vehicle, and more particularly relates to the improvement of its inverter section.

2. Description of the Background Art

To maintain the condition of an air-conditioning system when an engine is temporarily stopped during a short period of time (e.g., during a so-called "idling stop" operation), it is conventionally known that a motor-driven compressor is preferably employed for a refrigerating cycle system of an automotive vehicle. Furthermore, it is conventionally known that a motor section of the motor-driven compressor is cooled by a low-pressure coolant gas.

Furthermore, there is a conventional motor-driven compressor having an inverter section mounted thereon, which is already proposed for automotive vehicles. The inverter section is equipped for driving an alternating-current motor under supply of direct-current power. More specifically, this conventional inverter-integrated motor-driven compressor includes a motor section and a compressor section which are connected in an axial direction. An inverter section is fixed to an end surface of the motor section opposed to the compressor section. The inverter section includes three-phase inverter modules for converting DC (direct-current) power into three-phase AC power and supplying the converted AC motor to the motor section, a smoothing capacitor for suppressing DC current ripples of the thee-phase inverter modules, a printed circuit board mounting a controller IC for intermittently controlling switching elements of the three-phase inverter modules and also mounting a power source IC, and a heat sink fixed to the bottom of the three-phase inverter circuit IC.

However, according to the above-described conventional inverter-integrated motor-driven compressor for an automotive vehicle, the motor section and the compressor section are arranged in the axial direction. The axial length of the apparatus tends to become long. It is hence difficult to replace the conventional belt-driven compressor by the above-described inverter-integrated motor-driven compressor. In other words, when the above-described inverter-integrated motor-driven compressor is installed in an engine room, it is necessary to change the layout of various devices to be placed in the engine room. The processes and the costs will increase.

Furthermore, the engine room capacity or volume available for the devices associated with the engine tends to decrease. The inverter-integrated motor-driven compressor needs to reduce its size and weight.

Furthermore, the three-phase inverter modules of the inverter section definitely require a proper cooling system. It was however difficult to cool the inverter section when it is placed adjacent to the motor section. More specifically, according to the conventional inverter-integrated motor-driven compressor, a cooling fan is fixed to a rotor to convey the cooling air into various portions in the motor section. Or, the motor section is cooled by a low-pressure coolant gas. However, it is not easy to effectively guide or introduce the cooling air or the low-temperature coolant gas toward the inverter section in the axial direction via a branched or bent route or passage of flow.

To solve the above problems, it will be possible to provide the inverter section on a housing, especially on an outer surface of the cylindrical wall of the motor section. However, in this case, it is necessary to dispose all of the circuit components on the outer surface of the cylindrical wall of the motor section. The circuit components include the power switching elements, the smoothing capacitor, and the control circuit constituting the three-phase circuit as well as numerous wiring for the use of power and control. This will necessarily increase the circumferential and axial size of the apparatus. The wiring work will become complicated. The increase in wiring length will induce the increase in wiring inductance and wiring resistance.

The above-described problems are not limited to the inverter-integrated motor-driven compressors and are also inherent to all of the inverter-integrated motors for automotive vehicles. The downsizing of the inverter section is hence earnestly required for the inverter-integrated motors for automotive vehicles. Especially, in addition to the downsizing, assuring anti-vibration properties is very important for the inverter-integrated motors for automotive vehicles. For example, the wiring of the inverter section is definitely required to secure adequate gap so as not to cause electrical short-circuit problems in the event of car crash. In this respect, there is a limit in realizing a high-density wiring, i.e., in realizing the downsizing of the inverter section.

SUMMARY OF THE INVENTION

To solve the above-described problems, the present invention has an object to provide an inverter-integrated motor for an automotive vehicle capable of assuring anti-vibration properties and realizing the downsizing of the inverter section.

To accomplish the above and other related objects, the present invention provides a first inverter-integrated motor for an automotive vehicle, including a housing, a cylindrical motor section accommodated in the housing, and an inverter circuit section fixed to the housing for converting direct-current power into three-phase alternating-current power and supplying the converted alternating-current power to the motor section, wherein the inverter circuit section includes power switching elements constituting respective arms of a three-phase inverter circuit, a smoothing capacitor connected between a pair of direct-current input terminals of the three-phase inverter circuit, a control circuit for controlling the power switching elements, and a wiring section for connecting the power switching elements, the smoothing capacitor, and the control circuit. According to the first inverter-integrated motor of the present invention, the wiring section includes a bus-bar integrated plate including numerous bus bars integrally molded into a resin molding plate portion so as to assure mutual electrical insulation. The bus-bar integrated plate is fixed to an outer surface of a cylindrical wall of the housing via the resin molding plate portion. Furthermore, distal ends of the bus bars protruding from the resin molding plate portion are connected to respective electrode terminals of the power switching elements, terminals of the smoothing capacitor, and predetermined joint portions of the control circuit. Furthermore, the bus-bar integrated plate is positioned at a radial outer side of the power switching elements fixed directly or via a radiator plate on the outer surface of the cylindrical wall of the housing. The bus-bar integrated plate extends in a tangential direction of the motor section with a predetermined radial gap kept therebetween.

According to the first inverter-integrated motor of the present invention, various circuit components are connected to each other via the bus-bar integrated plate serving as the wiring section. For example, the circuit components include the power switching elements, the smoothing capacitor fixed on the outer surface of the cylindrical wall of the housing, the control circuit mounted on a printed circuit board, and external connector sections for connecting the internal components to an external DC power source, an external control apparatus, and the motor section.

Preferably, the bus-bar integrated plate includes numerous bus bars arranged in a two-step or double-deck structure for realizing an effective intersectional wiring layout. The bus bars are integrally molded in the resin molding plate portion so as to assure electrical insulation between them or against external members. The bus-bar integrated plate is fixed to the outer surface of the cylindrical wall of the housing via the resin molding plate portion.

The bus-bar integrated plate is positioned above (i.e., at the radial outer side of) the power switching elements fixed directly or via the radiator plate (e.g., heat sink plate) on the outer surface of the cylindrical wall of the housing, so as to cover the power switching elements.

The power switching elements are preferably independent switching elements constituting the three-phase inverter circuit, or can be constituted by IC modules integrating a plurality of the switching elements or all of them as a hybrid package or as a monolithic integrated circuit. In the three-phase inverter circuit, a flywheel diode can be regarded as a two-terminal type switching element and a transistor can be regarded as a three-terminal type switching element.

The above-described inverter-integrated motor for an automotive vehicle brings the following functions and effects.

First of all, the bus-bar integrated plate of the present invention serves as an intensive or concentrated wiring means for mutually connecting the above-described constituent elements of the inerter section. The total number of required components can be reduced. The wiring work can be simplified. The high-density and high-current wiring system is realized at a once. Especially, the wiring of this invention sufficiently assures electrical insulation between respective bus bars and is free from the influence of deformation of the bus bars which may cause due to vibrations of the vehicle. The gap between neighboring bus bars can be greatly reduced.

Furthermore, the bus-bar integrated plate can be overlapped with and disposed above the power switching elements (so as to constitute a two-step or double-deck structure). This arrangement is effective to reduce the wiring length or distance as well as the wiring impedance. The radial size of the inverter section can be reduced. This contributes the downsizing of the inverter section.

Furthermore, the DC power source bus bar (i.e., high DC power source bus bar, grounding bus bar) are disposed above the power switching elements and can adequately shield the high-frequency switching noises emitted from the power switching elements.

Furthermore, there is no necessity of changing the wiring arrangement when the inerter section is disassembled for repair.

Moreover, the bus-bar integrated plate is heavy and rigid compared with individual bus bars. The bus-bar integrated plate can be firmly fixed to the housing via numerous joint portions. This greatly improves the durability of the wiring for the inverter section against vibrations or shocks. Especially, the natural mechanical resonance frequency of the bus-bar integrated plate is very small compared with those of respective bus bars. It becomes possible to greatly reduce the durability of the inverter section against vibrations of a vehicle body or a rotary machine (such as a compressor) driven by the motor section. In other words, the bus-bar integrated plate can effectively prevent the joint portions of respective bus bars from loosing due to the mechanical resonance phenomenon.

According to a preferable embodiment of the present invention, the bus-bar integrated plate is positioned between the power switching elements fixed directly or via the radiator plate on the outer surface of the cylindrical wall of the housing and a printed circuit board positioned at the radial outer side of the power switching elements and extending in a tangential direction of the motor section for mounting the control circuit. The bus-bar integrated plate is substantially parallel to the printed circuit board, and overlaps with the power switching elements and the printed circuit board with predetermined radial gaps kept therebetween.

According to this arrangement, the control circuit is mounted on the printed circuit board independent of the bus-bar integrated plate. This arrangement is advantageous in that low-current components can be surely separated from high-current components. More specifically, the control circuit consists of numerous circuit elements, including a microcomputer, operable with very small or weak current for intermittently controlling the power switching elements in the three-phase inverter circuit. On the other hand, the bus-bar integrated plate is used for high-current wiring. The printed circuit board is disposed in parallel with the bus-bar integrated plate. With this arrangement, it becomes possible to reduce the size and weight of the bus-bar integrated plate because the bus-bar integrated plate can be exclusively used for high-current components. Furthermore, the printed circuit board, the bus-bar integrated plate, and the power switching elements constitute a three-step or triple-deck structure. This arrangement is effective to reduce the wiring length or distance. The radial size of the inverter section can be reduced. Furthermore, distal ends of respective bus bars protruding from the bus-bar integrated plate can be easily bent perpendicularly and inserted into terminal holes of the printed circuit board. The electrical connection, i.e., a vertical wiring, between the power switching elements and the printed circuit board can be easily realized by the bus bars of the bus-bar integrated plate.

As a modified embodiment, it is possible to bond the printed circuit board onto an opposed surface of the bus-bar integrated plate where no power switching elements are provided. In this case, it is preferable that terminals of electric components protruding from another principal surface of the printed circuit board opposed to a mounting surface are accommodated in a hole or cavity formed in the resin molding plate portion of the bus-bar integrated plate. This is effective in realizing the downsizing of the inverter section. Furthermore, the printed circuit board may be omitted if the circuit components of the control circuit are directly mounted on the principal surface of the bus-bar integrated plate. In this case, it is preferable to form an etching copper foil pattern on the surface of the bus-bar integrated plate as a wiring layer of the control circuit.

According to the preferable embodiment of the present invention, the resin molding plate portion of the bus-bar integrated plate is integrally resin molded with an outer frame portion. The outer frame portion is fixed to the outer surface of the cylindrical wall of the housing so as to surround the power switching elements and the printed circuit board. And, the resin molding plate portion extends in the tangential direction of the motor section from an inner surface of the outer frame portion.

According to this arrangement, the bus-bar integrated plate can be easily fixed to the housing. The mechanical strength or rigidity of the bus-bar integrated plate can be easily improved. The anti-vibration properties of the bus bars can be improved. It is also possible to prevent the bus bars from loosing. The reliability of joint portions of respective bus bars can be surely maintained.

Furthermore, the outer frame portion surrounds the entire periphery of the power switching elements and the printed circuit board and has the capability of protecting them. Accordingly, the housing requires no metal outer frame. The weight of the inverter section can be reduced.

According to the preferable embodiment of the present invention, an outer peripheral portion of the printed circuit board is connected to a stepped surface of the outer frame portion which is positioned lower than a top surface of the outer frame portion, and an inside space of the outer frame portion is closed by a cover plate which is fixed to the top surface of the outer frame portion. The printed circuit board can be easily installed. The work for positioning or adjusting the terminal holes of the printed circuit board to corresponding bus-bar terminals protruding from the bus-bar integrated plate can be accurately performed.

According to the preferable embodiment of the present invention, a central support shaft, integrally formed with the resin molding plate portion or with the outer frame portion, is brought into contact with a central portion of the printed circuit board. The central support shaft suppresses vibrations of the printed circuit board. The anti-vibration properties of the printed circuit board can be further improved. Alternatively, it is possible to provide a different central support shaft extending downward from the central portion of the bus-bar integrated plate toward the outer surface of the cylindrical wall of the housing, while an outer periphery of the bus-bar integrated plate is supported by the outer frame portion. This arrangement improves the mechanical strength or rigidity of the bus-bar integrated plate.

According to the preferable embodiment of the present invention, a grounding bus bar, serving as a low DC line of the inverter circuit section, protrudes from the resin molding plate portion or from the outer frame portion and is fixed on the outer surface of the cylindrical wall of the housing. The grounding bus bar of this arrangement brings the effect of cooling, grounding, and electromagnetic shield. The wiring impedance at the ground line of the inverter section becomes small. The loss and heat generation can be reduced. By widely spreading the grounding bus bar within the idle space of the bus-bar integrated plate, it becomes possible to effectively shield the electromagnetic radiation noises emitted from the power switching elements. Furthermore, the wide spread grounding bus bar can be used to efficiently release the heat generated from the power switching elements or from the smoothing capacitor to the housing.

It is possible to provide a power source bus bar, serving as a high DC line of the inverter circuit section, protrudes from the resin molding plate portion or from the outer frame portion and is fixed on the outer surface of the cylindrical wall of the housing via an insulation sheet. The power source bus bar of this arrangement brings the effect of cooling and increases the capacitance of the smoothing capacitor. A required capacitance for the smoothing capacity can be easily reduced with a simplified arrangement. Furthermore, the power source bus bar can be used to efficiently release the heat generated from the power switching elements or from the smoothing capacitor to the housing.

According to the preferable embodiment of the present invention, a grounding bus bar, connected to a grounding conductor of the printed circuit board constituting part of the inverter circuit section, protrudes from the resin molding plate portion or from the outer frame portion and is fixed on the outer surface of the cylindrical wall of the housing. The grounding bus bar of this arrangement brings the effect of cooling, grounding, and electromagnetic shield. The printed circuit board is effectively cooled. The temperature increase in the control circuit, including a microcomputer and a power source IC, mounted on the printed circuit board can be effectively suppressed. The wiring impedance of the grounding bus bar can be decreased. The electromagnetic noises emitted from the printed circuit board to the outside or transmitted from the outside to the printed circuit board can be effectively shielded. The loss and heat generation can be reduced.

It is preferable that the grounding bus bar is connected to an electromagnetic shield line which covers the power source line supplying electric power to the circuit of the printed circuit board or is connected in parallel with the power source line. This is effective to shield the electromagnetic radiation noises or suppress the high-frequency noise voltage appearing on the power source line. Furthermore, it is preferable that the above-described ground wiring conductor is formed as wide as possible on the printed circuit board from various reasons. It is also preferable that the contact surface between the grounding bus bar and the ground wiring conductor on the printed circuit board is formed as large as possible.

According to the preferable embodiment of the present invention, external power source terminals, integrally formed with or connected to the power source bus bar serving as the high DC line of the inverter circuit section, are connected to external power source cables, and a power connector section is integrally formed with the outer frame portion so as to surround the external power source terminals. The power connector section (i.e., an extended outer frame portion surrounding or protecting the external power source terminals of the motor section) is integrally formed with the bus-bar integrated plate and the outer frame portion. The total number of parts can be reduced. The external power source terminals can be protected properly.

According to the preferable embodiment of the present invention, external communication terminals, serving as communication transmission lines intervening between the control circuit and an external device, are connected to external communication cables, and a communication connector section is integrally formed with the outer frame portion so as to surround the external communication terminals. The communication connector section is a frame portion integrally formed with the bus-bar integrated plate and the outer frame portion for surrounding and protecting the external communication terminals. The total number of parts can be reduced. The external communication terminals can be protected properly.

The above-explained bus-bar integrated plate can be easily manufactured. For example, the bus bar pattern is first formed by press forming a conductor plate according to a technology similar to an IC lead frame manufacturing technique. Then, the bus bar pattern is integrated with a resin by resin molding or by insert molding. Then, tie bars (i.e., joint portions) of the bus bar pattern are cut or removed to leave numerous bus bars.

The present invention provides a second inverter-integrated motor for an automotive vehicle, including a housing, a cylindrical motor section accommodated in the housing, and an inverter circuit section fixed to the housing for converting direct-current power into three-phase alternating-current power and supplying the converted alternating-current power to the motor section, wherein the inverter circuit section includes power switching elements constituting respective arms of a three-phase inverter circuit, a smoothing capacitor connected between a pair of direct-current input terminals of the three-phase inverter circuit, a control circuit for controlling the power switching elements, and a plurality of bus bars constituting a wiring for connecting the power switching elements, the smoothing capacitor, and the control circuit. According to the second inverter-integrated motor of the present invention, the power switching elements and the smoothing capacitor are fixed directly or via a radiator plate on an outer surface of a cylindrical wall of the housing. Circuit components constituting the control circuit are mounted on a printed circuit board disposed at a radial outer side of the power switching elements, with the bus bars intervening between the printed circuit board and the power switching elements, and the power switching elements are connected to the printed circuit board via the bus bars.

The second inverter-integrated motor for an automotive vehicle according to the present invention includes an embodiment different from the above-described first inverter-integrated motor in omitting the resin molding plate portion from the bus-bar integrated plate.

According to the second inverter-integrated motor of the present invention, the housing can serve as a heat sink for cooling the power switching elements and the smoothing capacitor which generate heat during operation because these circuit components are fixed on the outer surface of the cylindrical wall of the housing. The high-current bus bars are located above and overlapped with the power switching elements so as to constitute a two-step or double-deck structure. The wiring length of the bus bars can be shortened. The bus bars can serve as an electromagnetic shield for the power switching elements. Furthermore, the printed circuit board is disposed over and overlapped with the bus bars. The space required for the inverter circuit can be reduced. In this case, a vertical wiring ranging from the printed circuit board to the power switching elements is required. The bus bars located between them can easily provide such a wiring.

The present invention provides a third inverter-integrated motor for an automotive vehicle, including a housing, a cylindrical motor section accommodated in the housing, and an inverter circuit section fixed to the housing for converting direct-current power into three-phase alternating-current power and supplying the converted alternating-current power to the motor section, wherein the inverter circuit section includes power switching elements constituting respective arms of a three-phase inverter circuit, a smoothing capacitor connected between a pair of direct-current input terminals of the three-phase inverter circuit, a control circuit for controlling the power switching elements, and a plurality of bus bars constituting a wiring for connecting the power switching elements, the smoothing capacitor, and the control circuit. According to the third inverter-integrated motor of the present invention, the inverter circuit section is accommodated in a closed space defined by an outer frame portion fixed on an outer surface of a cylindrical wall of the housing, a cover plate fixed on a top surface of the outer frame portion, and the outer surface of the cylindrical wall of the housing, and the outer frame portion surrounds terminals of the motor section extending out of the cylindrical wall of the housing.

According to the third inverter-integrated motor for an automotive vehicle according to the present invention, an accommodation casing for the inverter section is defied by the outer surface of the cylindrical wall of the housing, the outer frame portion fixed on the outer surface of the cylindrical wall of the housing, and the cover plate fixed on the outer frame portion. The leader lines of the motor section protrude into the outer frame portion. The connection between the leader lines and the inverter section becomes simple. The leader lines and their joint portions are protected by the outer frame portion. By filling the closed space with a resin or a gel, the electrical insulation and moistureproofness of the wiring can be further improved.

The present invention provides a forth inverter-integrated motor for an automotive vehicle, including a housing, a cylindrical motor section accommodated in the housing, and an inverter circuit section fixed to the housing for converting direct-current power into three-phase alternating-current power and supplying the converted alternating-current power to the motor section, wherein the inverter circuit section includes power switching elements constituting respective arms of a three-phase inverter circuit, a smoothing capacitor connected between a pair of direct-current input terminals of the three-phase inverter circuit, a control circuit for controlling the power switching elements, and a plurality of bus bars constituting a wiring for connecting the power switching elements, the smoothing capacitor, and the control circuit. According to the forth inverter-integrated motor for an automotive vehicle according to the present invention, the inverter circuit section is accommodated in a closed space defined by an outer frame portion fixed on an outer surface of a cylindrical wall of the housing, a cover plate fixed on a top surface of the outer frame portion, and the outer surface of the cylindrical wall of the housing, and the closed space for accommodating the inverter circuit section is filled with a resin.

According to the fourth inverter-integrated motor for an automotive vehicle according to the present invention, a casing for accommodation the inverter section is defied by the outer frame portion fixed on the outer surface of the cylindrical wall of the housing, the cover plate fixed on the top surface of the outer frame portion, and the outer surface of the cylindrical wall of the housing. This arrangement improves electrical insulation, moistureproofness, and anti-vibration properties of the wiring and its connecting portions. Regarding the resin to be filled in the closed space, a soft gel-state resin or a hardened resin can be used.

Furthermore, the present invention has an object to provide an inverter-integrated motor-driven compressor for an automotive vehicle which has a simplified cooling arrangement for an inverter section and is capable of effectively cooling the inverter section and has a compact axial size advantageous in installing it into a narrow and limited space of an automotive engine room.

To accomplish the above and other related objects, the present invention provides a first inverter-integrated motor-driven compressor for an automotive vehicle, including a compressor section constituting part of a refrigerating cycle apparatus, a motor section integrally connected to the compressor section for driving the compressor section, a housing for accommodating the compressor section and the motor section, and an inverter circuit section including a predetermined number of power switching elements for converting direct-current power into three-phase alternating-current power and supplying the converted alternating-current power to the motor section. According to the first inverter-integrated motor-driven compressor of the present invention, the motor section is cooled by a low-pressure coolant gas, and the power switching elements are constituted by discrete transistors each having a side surface from which electrode terminals protrude and a bottom surface directly placed on an outer surface of a cylindrical wall of the housing at a portion surrounding the motor section.

The discrete transistors of the present invention are independent power transistor elements each including a semiconductor chip coated by a resin and configured into a plate shape. For example, the semiconductor chip includes an IGBT (i.e., insulated gate bipolar transistor) or a MOST (i.e., metal oxide semiconductor transistor), or a pair of this kind of transistor and a flywheel diode. Furthermore, according to the present invention, the discrete transistors are expressed as being directly brought into contact with the outer surface of the cylindrical wall of the housing even when a resin sheet or heat conductive grease interposes between them.

According to the first inverter-integrated motor-driven compressor of the present invention, the cooling arrangement for an inverter section is simple and the inverter section is effectively cooled. The axial size is so compact that the apparatus can be easily installed into a narrow and limited space of an automotive engine room.

According to the first inverter-integrated motor-driven compressor of the present invention, the inverter section is fixed on the outer surface of the cylindrical wall of the motor section. This arrangement makes it possible to reduce the axial size of the inverter-integrated motor-driven compressor for an automotive vehicle.

Furthermore, the cylindrical wall of the motor section can be properly cooled by the low-pressure coolant gas flowing inside the motor section. The cylindrical wall of the motor section can serve as a heat sink for cooling the inverter section. No special heat sink is required for cooling the power switching elements of the inverter section as they are directly fixed on the cylindrical wall of the motor section which is continuously kept at a low-temperature level. The heat generated from the power switching elements is efficiently released to the cylindrical wall of the motor section. The cylindrical wall of the motor section has a large heat capacity. This greatly improves the allowance limit in a short-period heat generation from the power switching elements of the inverter section. Furthermore, the size or height of the inverter section in the radial direction can be reduced by the amount corresponding to an omitted conventional heat sink. Thus, the first inverter-integrated motor-driven compressor of the present invention is easily installable into a narrow and limited space of the automotive engine room.

Furthermore, according to the first inverter-integrated motor-driven compressor of the present invention, a plurality of power switching elements constituting respective arms of the three-phase inverter circuit are separately packaged as discrete transistors which are separately placed on the outer surface of the cylindrical wall of the housing. This arrangement brings thermal and mechanical improvement for the outer surface of the cylindrical wall portion (i.e., mounting base portion) for mounting the inverter section. More specifically, the mounting base portion for mounting respective discrete transistors becomes compact. The height (i.e., radial thickness) of the mounting base portion can be reduced to a smaller value. The heat transfer resistance is small. The power switching elements of the inverter section are cooled efficiently.

According to a preferable embodiment of the present invention, the outer surface of the cylindrical wall of the housing includes a mounting base portion having a flat mounting base surface brought into contact with a flat bottom surface of the discrete transistors. The discrete transistors are anchored into screw holes formed on the cylindrical wall of the housing. The screw holes extend perpendicularly to the mounting base surface and are offset in the circumferential direction toward a thicker wall region of the housing within the mounting base surface.

According to this embodiment, respective discrete transistors are anchored at the circumferentially offset region within the mounting base portion where the cylindrical wall of the housing is sufficiently thick. The mounting base portion is compact is structure and light in weight. The heat transfer resistance is suppressed to a smaller value.

According to the preferred embodiment of the present invention, the electrode terminals of respective discrete transistors protrude in the circumferential direction toward a thinner wall region of the housing within the mounting base surface. According to this arrangement, the height of the electrode terminals departing from the outer surface of the cylindrical wall of the housing can be suppressed within a smaller value. As a result, the radial size of the inverter section becomes small. The downsizing of an inverter-integrated motor-driven compressor can be realized. The joint portions of the electrode terminals of respective discrete transistors can be orderly arranged on the same plane.

According to the preferred embodiment of the present invention, the discrete transistors are placed on the same plane constituted by the mounting base surface. This arrangement is advantageous in orderly arranging the joint portions of the electrode terminals of respective discrete transistors on the same plane. It becomes possible to improve the workability in the wiring work and also to automate the wiring work.

According to the preferred embodiment of the present invention, a group of discrete transistors having mutually different phases are arrayed in line in the axial direction. Two discrete transistors having the same phase are disposed next to each other in the circumferential direction, with the electrode terminals of one discrete transistor facing to the electrode terminals of the other discrete transistor. And, a wiring region having a predetermined circumferential width for the protruding electrode terminals is provided between the two discrete transistors having the same phase.

This arrangement is advantageous in providing a high-density wiring for connecting the discrete transistors constituting the three-phase inverter circuit. The wiring length can be shortened.

According to the preferred embodiment of the present invention, the mounting base surface of the mounting base portion has a stepped flat portion raised or protruded by a predetermined height in the radial direction compared with an adjacent flat region where the discrete transistors are disposed. The stepped flat portion corresponds to the wiring region. It becomes possible to increase the cylindrical wall of the housing at the limited region corresponding to the wiring region, without interfering with the discrete transistors and also without increasing the height or protrusion of the inverter section in the radial direction. The mechanical strength of the housing can be improved. Especially, this embodiment is preferably employable in the case that the cylindrical wall of the housing is partly cut or removed along a chord to leave a flat mounting base surface sufficient for mounting all of the discrete transistors, without increasing the radial height or thickness of the mounting base portion. Providing the stepped portion at a circumferential region corresponding to the wiring region compensates the reduction in the mechanical strength in the thinner wall region of the housing.

According to the preferred embodiment of the present invention, the discrete transistors are accommodated in a space defined by an outer frame portion brought into contact with the outer surface of the cylindrical wall of the housing, and the space for accommodating the discrete transistors is filled with a resin member.

More specifically, when the thee-phase inverter circuit is constituted by numerous discrete transistors, it is needless to say that the terminals of respective discrete transistors must be connected in a predetermined pattern. According to the above embodiment of the present invention, respective discrete transistors are directly fixed on the outer surface of the cylindrical wall of the metallic housing for the motor-driven compressor. The electrode terminals protrude from a side surface of each transistor and extend along the outer surface of the cylindrical wall of the housing. The electrode terminals and the wiring are necessarily positioned closely to the outer surface of the cylindrical wall of the metallic housing. Accordingly, the possibility of causing surface discharge is relatively high.

Hence, according to the above-described embodiment of the present invention, the outer frame portion surrounding respective discrete transistors is fixed to the outer surface of the cylindrical wall of the housing. Preferably, a cover plate is provided on the top surface of the outer frame portion. The cover plate, the outer frame portion, and the outer surface of the cylindrical wall of the housing cooperatively define a closed space for surrounding the discrete transistors and the wiring. The closed space is filled with a resin. The resin is in a liquefied or gel state when injected into the closed space and is hardened later naturally or trough a heat treatment.

According to the above-described arrangement, the surface discharge does not occur between the electrode terminals or the wiring and the outer surface of the cylindrical wall of the housing. The closed space can be used for accommodating the printed circuit board, the bus-bar wiring, and various electrical joint portions. The electrical insulation and anti-vibration properties of these circuit components can be greatly improved. The outer frame portion is preferably a resin-made product. However, it is possible to employ a metallic outer frame portion which may be integrally formed with or connected by means of screws or the like to the cylindrical wall of the housing.

Furthermore, filling the chamber of the outer frame portion with an electrical insulation material effectively reduces a vibration energy given from the motor-driven compressor to the printed circuit board, the wiring or the terminals accommodated in this space, and accordingly improves the reliability of joint portions.

According to the preferred embodiment of the present invention, a resin insulation sheet is disposed on the outer surface of the cylindrical wall of the housing at a region facing to the wiring region.

More specifically, when the thee-phase inverter circuit is constituted by numerous discrete transistors, it is needless to say that the terminals of respective discrete transistors must be connected in a predetermined pattern. According to the above embodiment of the present invention, respective discrete transistors are directly fixed on the outer surface of the cylindrical wall of the metallic housing for the motor-driven compressor. The electrode terminals protrude from a side surface of each transistor and extend along the outer surface of the cylindrical wall of the housing. The electrode terminals and the wiring are necessarily positioned closely to the outer surface of the cylindrical wall of the metallic housing. Accordingly, the possibility of causing surface discharge is relatively high.

Hence, according to the above-described embodiment of the present invention, the insulation sheet is disposed on the outer surface of the cylindrical wall of the housing at a region facing to the wiring region where the electrode terminals of respective discrete transistors and associated bus bars are closely arranged. The insulation sheet is embedded between the discrete transistors and the outer surface of the cylindrical wall of the housing. This arrangement makes it possible to reduce the clearance or gap between the electrode terminals of respective discrete transistors or the associated bus bars and the outer surface of the cylindrical wall of the housing. The overall height of the inverter section can be reduced.

According to the preferred embodiment of the present invention, a smoothing capacitor is provided at a circumferential end of the power switching elements with the wiring region disposed at the opposite side.

More specifically, according to the above-described embodiment of the present invention, the smoothing capacitor is disposed adjacent to the group of discrete transistors in the circumferential direction. From the requirements in the wiring work for the smoothing capacitor, the smoothing capacitor is inserted into an accommodation hole extending perpendicularly to the mounting base surface on which the discrete transistors are disposed. In this case, the smoothing capacitor is offset from the group of discrete transistors in the circumferential direction and can be disposed deeply in the thicker wall region of the cylindrical housing. As a result, it becomes possible to prevent the inverter section from spreading laterally. The lateral width of the inverter section is small. The DC power source terminal section is disposed in the same direction as the smoothing capacitor. The smoothing capacitor can be disposed between the three-phase inverter circuit and the DC power source terminal section. The smoothing capacitor absorbs high-frequency components of switching currents flowing in the three-phase inverter circuit before they reach the DC power source terminal section. The overall length of the DC power source wiring can be reduced. The wiring impedance decreases. The switching surge noise voltage decreases, too.

Furthermore, the DC power source terminal section is connected to external cables. The connecting space for the external cables is easily and sufficiently secured.

According to the preferred embodiment of the present invention, an alternating-current output terminal section is provided at another circumferential end of the power switching elements far from the smoothing capacitor.

According to the arrangement of this embodiment, a sufficient and deep space for the alternating-current output terminal section can be secured. The axial width is also sufficiently secured due to the layout that the alternating-current output terminal section is circumferentially offset far from the smoothing capacitor or from the DC power source terminal section.

According to the above-described embodiment, the inverter section is disposed on the outer surface of the motor section. With this arrangement, it becomes possible to reduce adverse thermal influence given from a compression chamber of the compressor section, and also becomes possible to reduce adverse vibratory influence acting to the inverter section from the compressor section. The connecting line between the inverter section and the motor section can be shortened. To further reduce the adverse thermal influence, it is preferable that the leader terminals of motor stator coils extend toward an axial direction opposed to the compressor section and are taken out of the cylindrical wall of the housing.

Furthermore, to improve the ability for cooling the inverter section, it is preferable to provide a coolant passage in the cylindrical wall of the housing for allowing low-temperature and low-pressure coolant gas to flow at a portion just beneath the inverter section. Preferably, this coolant passage is a branched passage of a main coolant passage conveying the low-pressure coolant gas to the motor section. It is also preferable to guide the low-pressure coolant gas returning from an evaporator to the motor section via the above-described passage located just beneath the inverter section. With this arrangement, the low-pressure coolant gas having a temperature lower than the motor section can be used to cool the inverter section.

Furthermore, the present invention has an object to provide another inverter-integrated motor-driven compressor for an automotive vehicle which has excellent shock or impact resistance and waterproofness.

To accomplish the above and other related objects, the present invention provides a second inverter-integrated motor-driven compressor for an automotive vehicle, including a compressor section constituting part of a refrigerating cycle apparatus, a motor section integrally connected to the compressor section for driving the compressor section, a housing for accommodating the compressor section and the motor section, an inverter circuit section including a predetermined number of power switching elements for converting direct-current power into multi-phase alternating-current power and supplying the converted alternating-current power to the motor section, and an inverter casing fixed on an upper end portion of an outer cylindrical wall of the housing for accommodating the inverter circuit section. A motor power connector is detachably connected to a cable power connector of a power cable supplying electric power to the inverter circuit section. A motor communication connector is detachably connected to a cable communication connector of a communication cable constituting a communication path between the inverter circuit section and an external electronic device. Furthermore, the motor power connector and the motor communication connector protrude upward from a top surface of the inverter casing fixed on the upper end portion of the outer cylindrical wall of the housing.

According to the second inverter-integrated motor-driven compressor of the present invention, the motor power connector and the motor communication connector protrude upward from the top surface of the inverter casing fixed on the upper end portion of the outer cylindrical wall of the housing. According to this arrangement, the housing and the inverter casing of the motor-driven compressor can prevent the droplet or splash of rain or water, which may contain liquefied salt or harmful components, from reaching the connectors during the traveling of a vehicle. No liquid can enter inside the housing via the coupling portion of the connectors. The electrical insulation of the connectors, especially at joint portions between the terminals of the connectors, can be easily and adequately maintained.

Furthermore, even in the event that the vehicle stays or runs in a pool, a river, a shore, or in the comparable shallow water, it is possible to adequately maintain the electrical insulation of the connectors against the water because the connectors are positioned at the highest point of the motor-driven compressor.

According to a preferred embodiment of the present invention, the inverter circuit section includes the power switching elements fixed on the outer cylindrical wall of the housing, a control circuit section disposed above the power switching elements and including a printed circuit board mounting electronic circuit elements for controlling the power switching elements, and bus bars connecting the motor power connector and the motor communication connector to the power switching elements or to the control circuit section. The inverter casing includes a metallic base frame portion integrally formed with the outer cylindrical wall of the housing and opening upward so as to surround the power switching elements, a resin frame portion fixed to the base frame portion and opening upward so as to surround the printed circuit board of the control circuit section, and a cover plate closing the upper opening of the resin frame portion. The motor power connector and the motor communication connector include connecting terminals constituted by distal ends of the bus bars and extending vertically and a resin body portion integrally formed with the resin frame portion so as to be coupled with the cable power connector and the cable communication connector inserted or removed in the vertical direction.

With this arrangement, the connector terminals of the motor and the connector terminals of the cable are aligned in the vertical direction so as to allow mutual slide movement in the vertical direction. This greatly increases the anti-vibration properties of the connectors.

More specifically, according to the inverter-integrated motor-driven compressor for an automotive vehicle, the connector terminals are subjected to large vibrations or shocks. The vibrations or shocks act on the connector terminals so as to bend them. In general, the support of connector terminals to a resin body portion of the connector is a cantilever fashion. Thus, a large bending force acts on the distal end of respective connector terminals.

To simplify the structure and manufacturing processes, it is desirable that the resin frame portion supporting the bus bars of the inverter is integrally formed with the motor power connector and the motor communication connector and that the connector terminals are constituted by distal ends of the bus bars. However, in view of costs and electric resistance, the electric conductive members constituting the bus bars are made of soft metallic members (e.g., copper or copper alloy). As a result, the connector terminals tend to easily bend when subjected to vibrations or shocks. This is a serious problem for the communication connector because the communication connector uses thin terminals.

The inventors of the present invention have enthusiastically conducted the research and development to solve the above-described problem and have derived the conclusion that up-and-down vibrations of the vehicle give the most serious influence to the connectors of the motor-driven compressor. More specifically, when the vehicle is traveling, the vehicle body moves or vibrates in the up-and-down direction due to unevenness or undulations of the road. Although some of the up-and-down vibrations are absorbed by shock absorbers, the up-and-down vibrations frequently arise and last especially when the vehicle is running on a rough road. Hence, the up-and-down vibrations inherent to the vehicles are transmitted to the motor power connector and the motor communication connector via an engine block and the motor-driven compressor. As a result, the connector terminals vibrate in the up-and-down direction. If the vehicle wheel is trapped in a large recess or in a deep dent on the road, the connector terminals will receive a strong reaction force acting in the up-and-down direction. This reaction force will act as a large bending force if the connector terminals are disposed perpendicularly to this force.

To solve this problem, the second inverter-integrated motor-driven compressor of the present invention employs the arrangement that the connector terminals protrude or extend in the un-and-down direction.

According to this arrangement, the terminals of the motor power connector extend in the up-and-down direction and are brought into contact with the terminals of the cable power connector extending in the same direction. Similarly, the terminals of the motor communication connector extend in the up-and-down direction and are brought into contact with the terminals of the cable communication connector extending in the same direction. This arrangement is advantageous in that, even if a strong reaction force acts from the wheel, the connector terminals can receive this force as a compression force acting in its longitudinal direction. In other words, substantially no bending force acts on respective connector terminals fixed in a cantilever fashion to the resin body portion at the proximal ends. Accordingly, the connector terminals do not bend and do not lose the mechanical strength. No short-circuit occurs between adjacent connector terminals. This makes it possible to downsize the connectors and reduce the size or thickness of the terminals, without deteriorating the electric contact condition between the terminals of the motor power (or communication) connector and the terminals of the cable power (or communication) connector.

The above-described up-and-down direction includes the vertical direction with a marginal or tolerance angular range of ±10 degrees According to a preferred embodiment of the present invention, the housing or the base frame portion includes at least one protruding portion protruding laterally from the resin frame portion in a direction perpendicular to an axis of the motor-driven compressor.

Furthermore, the present invention has an object to provide another inverter-integrated motor-driven compressor for an automotive vehicle which is capable of shielding electromagnetic noises and possesses excellent shock or impact resistance and is also capable of downsizing the body and reducing the axial length.

To accomplish the above and other related objects, the present invention provides a third inverter-integrated motor-driven compressor for an automotive vehicle, including a housing, a motor-driven compressor accommodated in the housing, and an inverter circuit section fixed to the housing for converting direct-current power into multi-phase alternating-current power and supplying the converted alternating-current power to the motor-driven compressor. The inverter circuit section includes power switching elements constituting respective arms of a multi-phase inverter circuit, a smoothing capacitor connected between a pair of direct-current input terminals of the multi-phase inverter circuit, a control circuit for controlling the power switching elements, and a wiring section for connecting the power switching elements, the smoothing capacitor, and the control circuit. An inverter casing for accommodating the inverter circuit section is constituted by a metallic frame portion surrounding the inverter circuit section and protruding from an outer cylindrical surface of the housing, a cover plate closing an upper opening of the frame portion, and a cylindrical wall of the housing. The power switching elements and the smoothing capacitor are placed on a mounting surface formed on the outer cylindrical surface of the housing and surrounded by the frame portion. The wiring section includes a bus-bar assembly and a printed circuit board. The bus-bar assembly includes numerous bus bars integrally molded into a resin molding plate portion so as to assure mutual electrical insulation. The bus-bar assembly is fixed to the outer cylindrical surface of the housing or to the frame portion via the resin molding plate portion and disposed at a radial outer side of the power switching elements so as to extend in a tangential direction of the motor-drive compressor. And, the printed circuit board is interposed between the bus-bar assembly and the cover plate so as to extend in parallel with the bus-bar assembly for mounting the control circuit.

According to the third inverter-integrated motor-driven compressor of the present invention, the power switching elements and the smoothing capacitor are fixed on the mounting surface formed on the outer surface of the cylindrical wall of the housing. The heat generated from the power switching elements and from the smoothing capacitor can be efficiently transmitted or released to the mounting surface as the mounting surface is configured so as to just fit to the bottom surfaces of the power switching elements and the smoothing capacitor.

The wiring for the inverter circuit section is roughly classified into a high-current wiring and a low-current wiring. The high-current wiring can be constituted by a bus-bar assembly which includes numerous bus bars integrated with a resin molding plate portion by resin insert molding. Both terminals of respective bus bars, protruding from the resin molding plate portion, are connected to the electrode terminals of the power switching elements or to the terminals of the smoothing capacitor, or inserted into the connecting holes of the printed circuit board. The low-current wiring for the use of control is realized by a printed circuit board which mounts numerous electronic circuit elements. The bus-bar assembly extends above the power switching elements. The printed circuit board extends above the bus-bar assembly. The number of components can be minimized. The distance between the power switching elements and the bus-bar assembly is short. The power loss at the wiring is reduced.

The inverter casing, accommodating the inverter circuit section, is constituted by the outer cylindrical surface of the housing of the motor-driven compressor, the frame portion standing from this outer cylindrical surface, and the cover plate closing the upper opening of the frame portion. The number of components can be minimized. The required space for the inverter circuit section can be reduced. The electromagnetic noises emitted from the inverter circuit section to the outside or incoming from the outside to the inverter circuit section can be reduced. In this case, the inverter circuit section needs to be installed in the inverter casing in the order of the power switching elements, the bus-bar assembly, and the printed circuit board. As described above, the wiring is roughly integrated into two members. The installation of the inverter circuit section into the inverter casing is not complicated.

As described above, the wiring arrangement is very simple. The power switching elements are directly fixed on the outer cylindrical surface of the housing. Although the inverter casing is required for accommodating the inverter circuit section and for providing the electromagnetic shield, protrusion of the inverter casing in the radial direction can be reduced. The apparatus can be downsized.

Furthermore, employing the bus-bar assembly simplifies the wiring work. As the necessary wiring is substantially accomplished in the bus-bar assembly, the only necessary thing is to fix the resin molding plate portion of the bus-bar assembly to the frame portion or to the outer cylindrical surface of the housing. Furthermore, electrical insulation can be assured even if the gap between the bus bars in the resin molding plate portion is short.

Furthermore, a source generating largest electromagnetic noises is the power switching elements. Disposing the bus-bar assembly above the power switching elements is effective to shield the electromagnetic noises emitted from the power switching elements, because the bus-bar assembly is constituted by a lot of DC electric potential wirings. To enhance the electromagnetic shielding effect, it is desirable that the bus bars used for DC lines are formed as wide as possible when they are punched out in the manufacturing process of the bus-bar assembly. This is also effective to reduce the power caused by the resistance of the bus bars and also reduce the inductance. Furthermore, reducing the inductance of the bus bars used for DC lines brings the reduction of a switching noise voltage and accordingly reduces the electromagnetic noises.

According to a preferred embodiment of the present invention, the bus-bar assembly includes a connector protruding out of the frame portion or the cover plate for communications or power supply. The connector includes a connector base portion integrally formed with the resin molding plate portion of the bus-bar assembly and penetrating and protruding outward via an opening of the cover plate, and connector terminals integrally formed with the bus bars and supported by the connector base portion.

According to this arrangement, the connector base portion is attached beforehand to the resin molding plate portion of the bus-bar assembly. This eases taking out the power terminals. Furthermore, the communication or control connector is fixed to the resin molding plate portion of the bus-bar assembly. The total number of components is small. The connecting work is simple. The communication control connector and the power connector can use the same connector base portion. Preferably, the printed circuit board is fixed to the resin molding plate portion.

The above-explained bus-bar assembly can be easily manufactured. For example, the bus bar pattern is first formed by press forming a conductor plate according to a technology similar to an IC lead frame manufacturing technique. Then, the bus bar pattern is integrated with a resin by resin molding or by insert molding. Then, tie bars (i.e., joint portions) of the bus bar pattern are cut or removed to leave numerous bus bars.

The power switching elements are preferably independent switching elements constituting the three-phase inverter circuit, or can be constituted by IC modules integrating a plurality of the switching elements or all of them as a hybrid package or as a monolithic integrated circuit or as a bear chip package. In the three-phase inverter circuit, a flywheel diode can be regarded as a two-terminal type power switching element and a transistor can be regarded as a three-terminal type power switching element.

BRIEF DESCRIPTION OF THE DRAWINGS

These and other objects, features, aspects and advantages of the present invention will become more apparent from the following detailed description of the present invention which is to be read in conjunction with the accompanying drawings, in which:

FIG. 19 is a plan view showing the inverter-integrated motor-driven compressor shown in FIG. 15, although a cover plate is removed.

DESCRIPTION OF THE PREFERRED EMBODIMENTS

First Embodiment

An inverter-integrated motor-driven compressor of a refrigerating cycle for an automotive vehicle in accordance with a first embodiment of the present invention will be explained with reference to accompanied drawings, although some of constituent members and lines are omitted.

Figure 1:
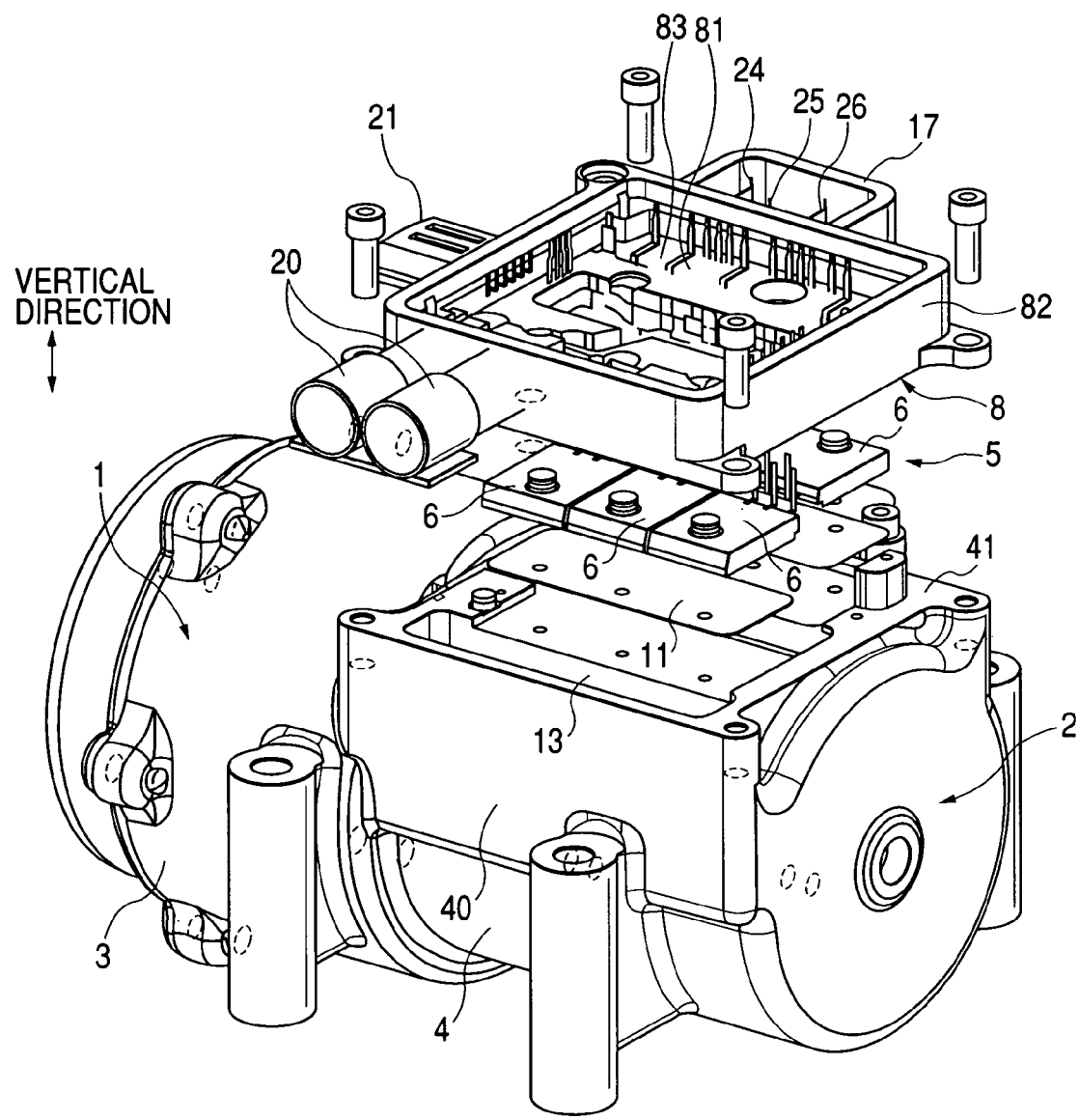
FIG. 1 is an exploded perspective view showing an inverter-integrated motor-driven compressor in accordance with a first embodiment of the present invention.

FIG. 1 is an exploded perspective view showing the inverter-integrated motor-driven compressor in accordance with the first embodiment of the present invention.

Figure 2:
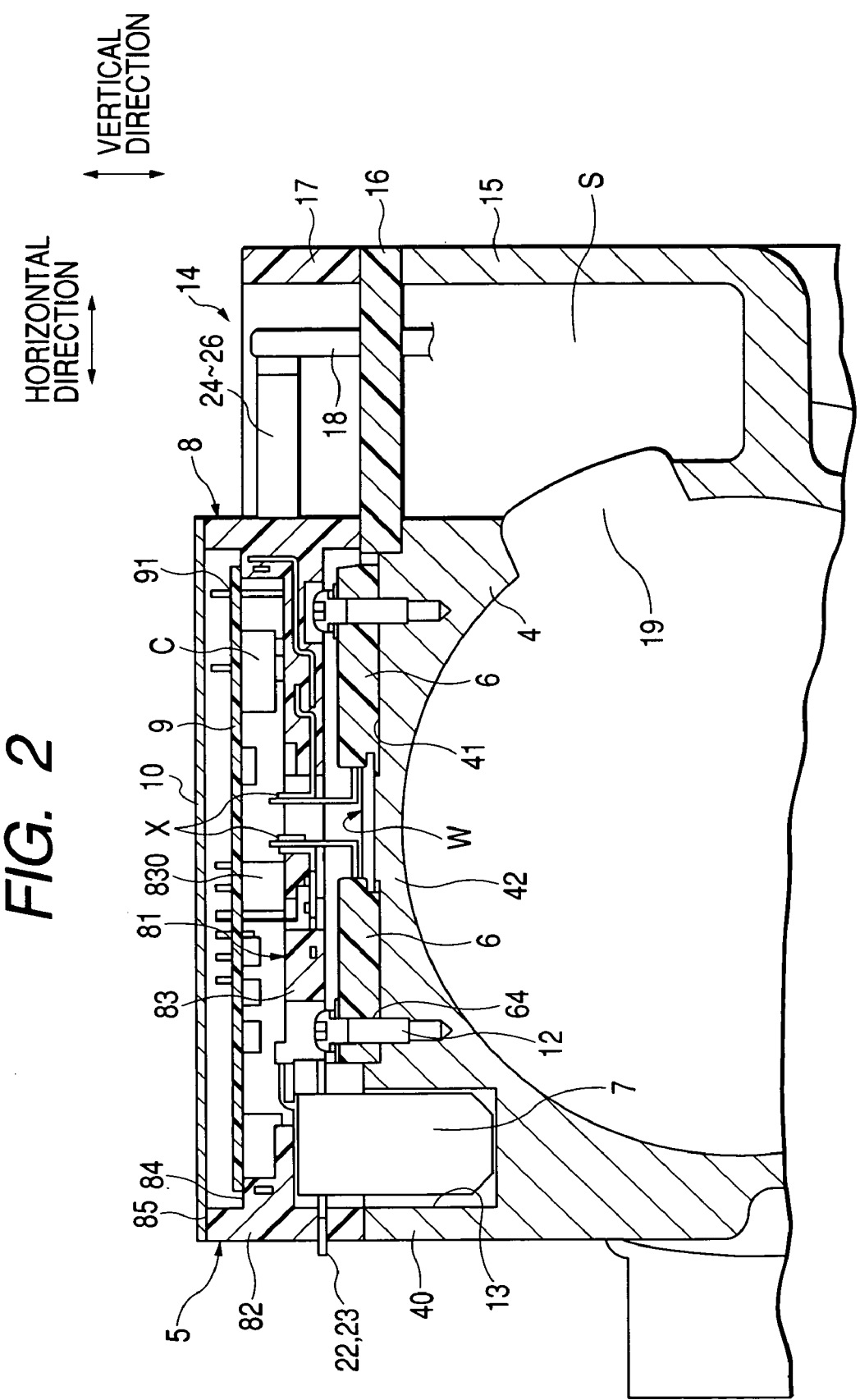
FIG. 2 is a cross-sectional view showing an inverter circuit section of the inverter-integrated motor-driven compressor shown in FIG. 1, taken along the radial direction of the compressor.

FIG. 2 is a cross-sectional view showing an inverter circuit section of the inverter-integrated motor-driven compressor shown in FIG. 1, taken along the radial direction of the compressor. FIG. 2 shows the inverter circuit attached to a housing of the motor driven compressor. FIG. 2 does not show a refrigerating circuit as it is conventionally well known.

Figure 3:
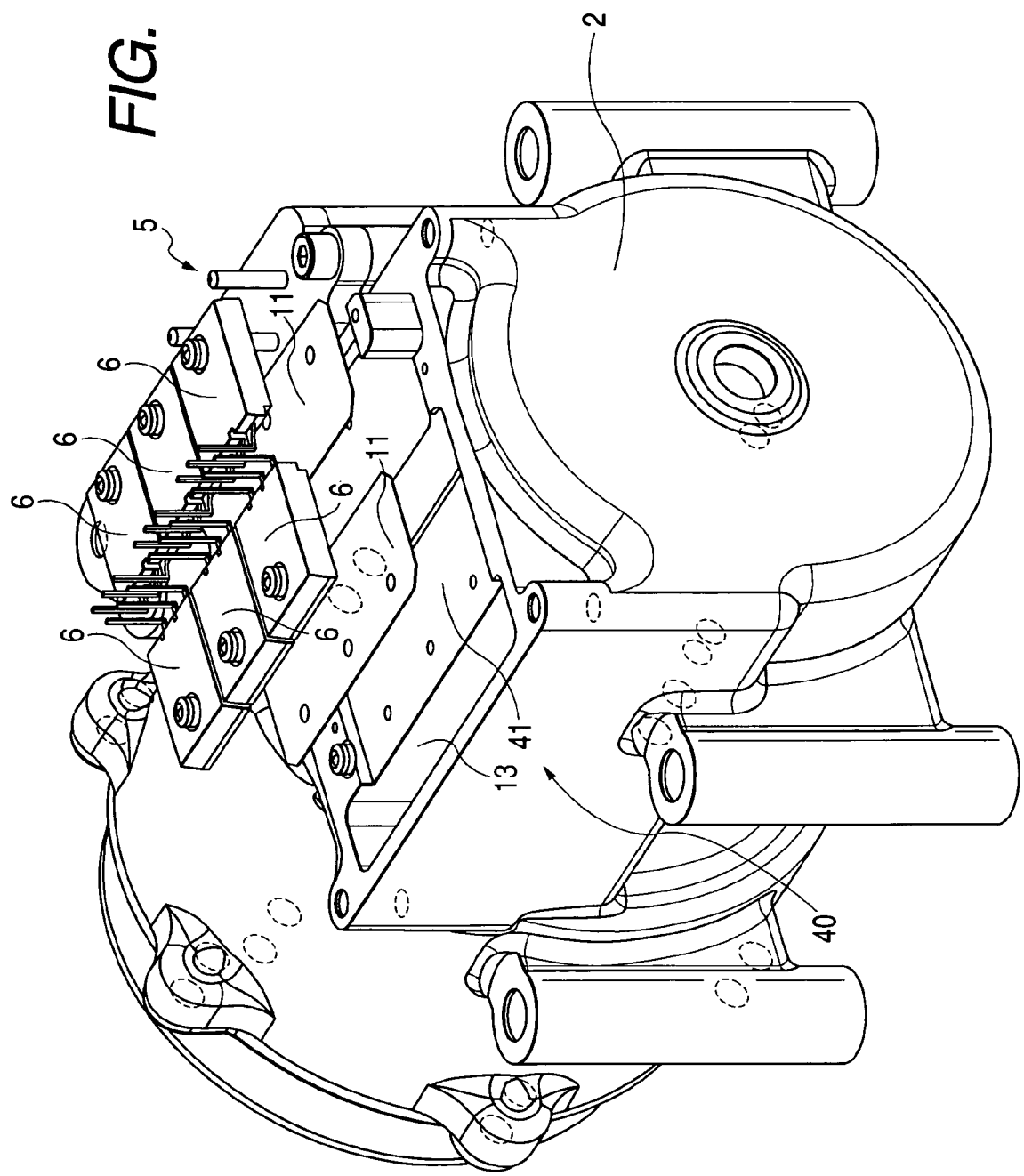
FIG. 3 is an exploded perspective view showing a plurality of power MOS transistor modules mounted on a mounting base surface of a motor housing in accordance with the first embodiment of the present invention.

FIG. 3 is an exploded perspective view showing a plurality of power MOS transistor modules 6 mounted on a mounting base surface 41 of a motor housing 4.

Figure 4:
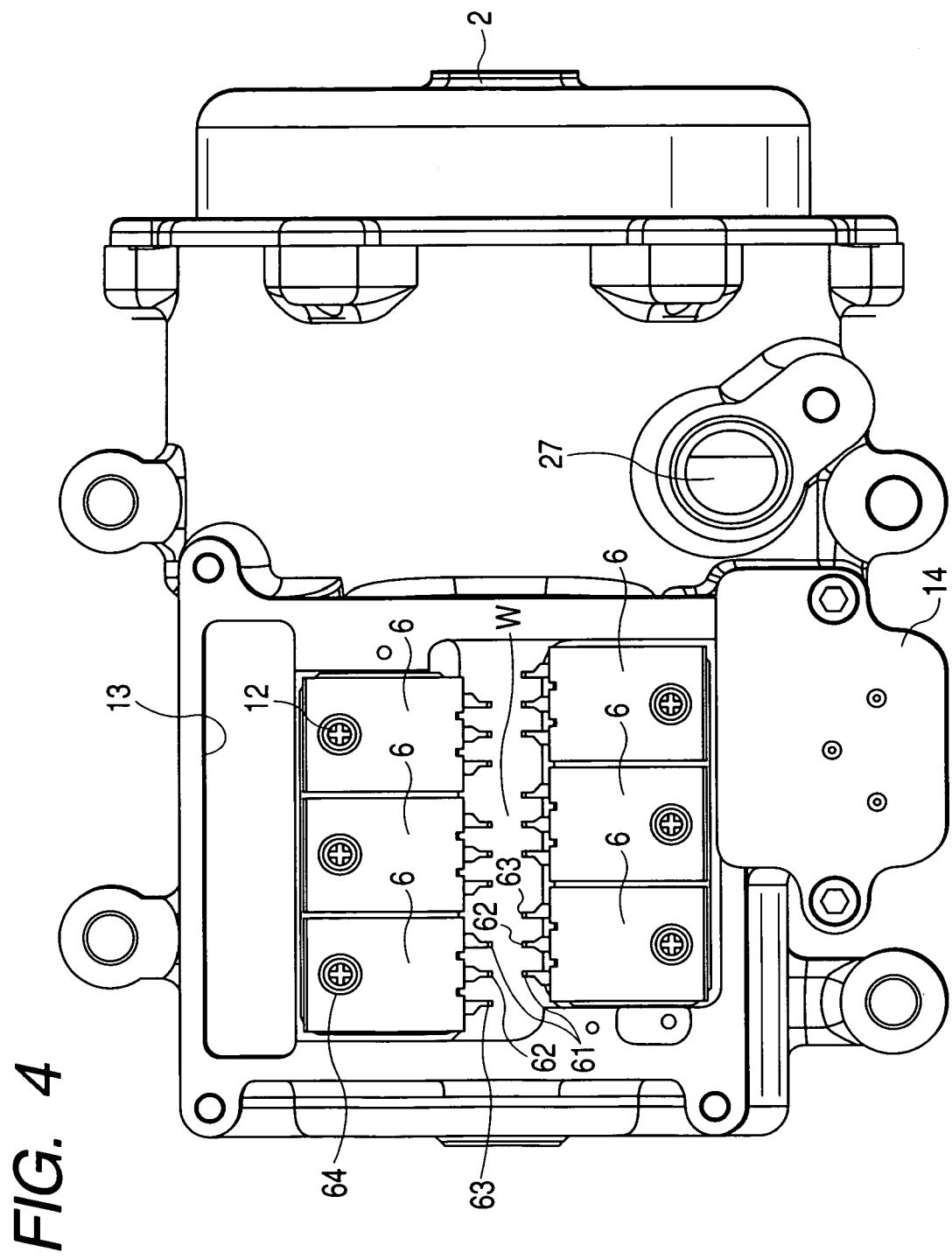
FIG. 4 is a plan view showing the power MOS transistor modules mounted on the mounting base surface of the motor housing in accordance with the first embodiment of the present invention.

FIG. 4 is a plan view showing the power MOS transistor modules 6 mounted on the mounting base surface 41 of the motor housing 4.

Figure 5:
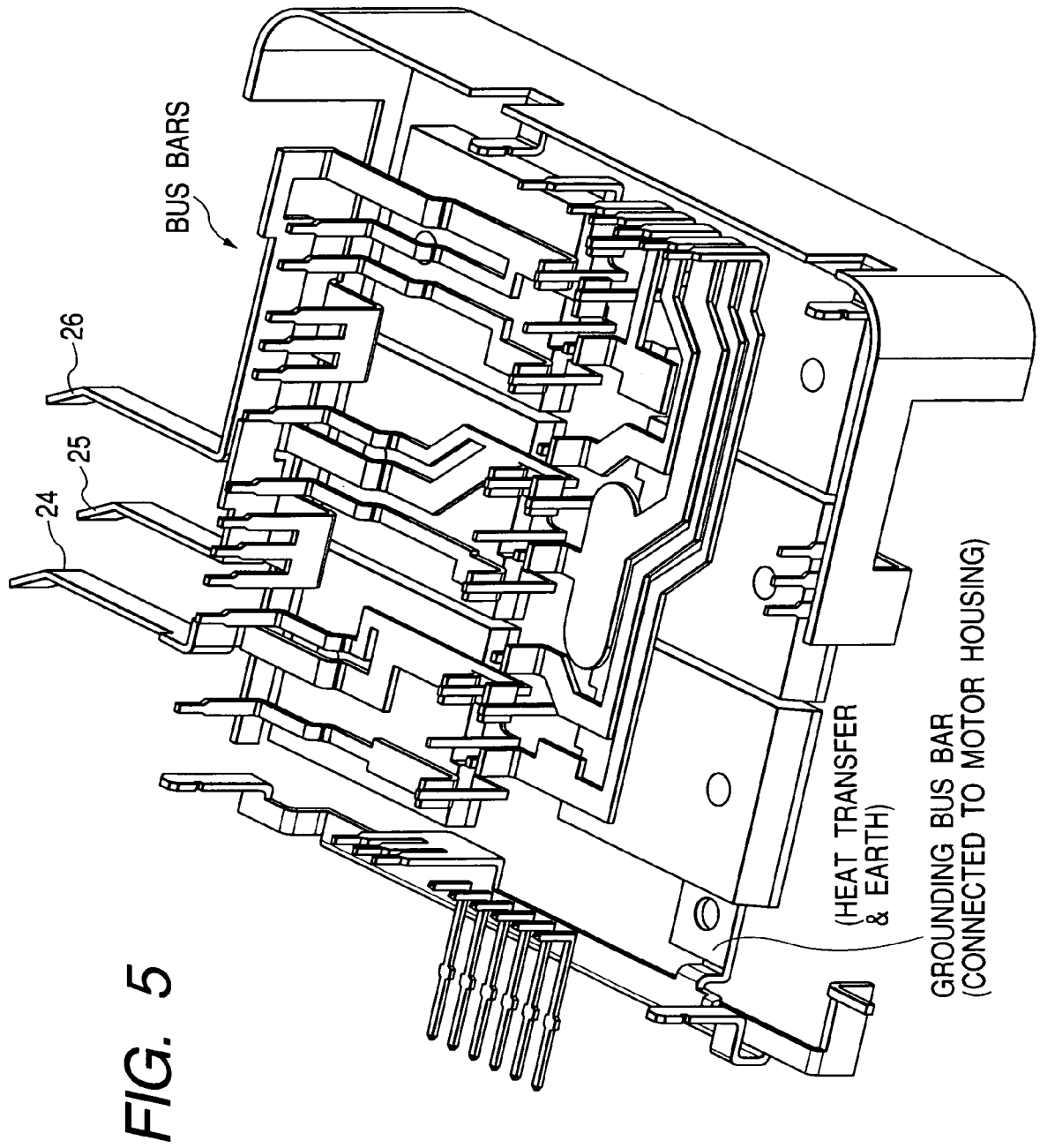
FIG. 5 is a perspective view showing part of numerous bus bars in a bus-bar integrated plate in accordance with the first embodiment of the present invention.

FIG. 5 is a perspective view showing part of numerous bus bars in a bus-bar integrated plate.

Figure 6:
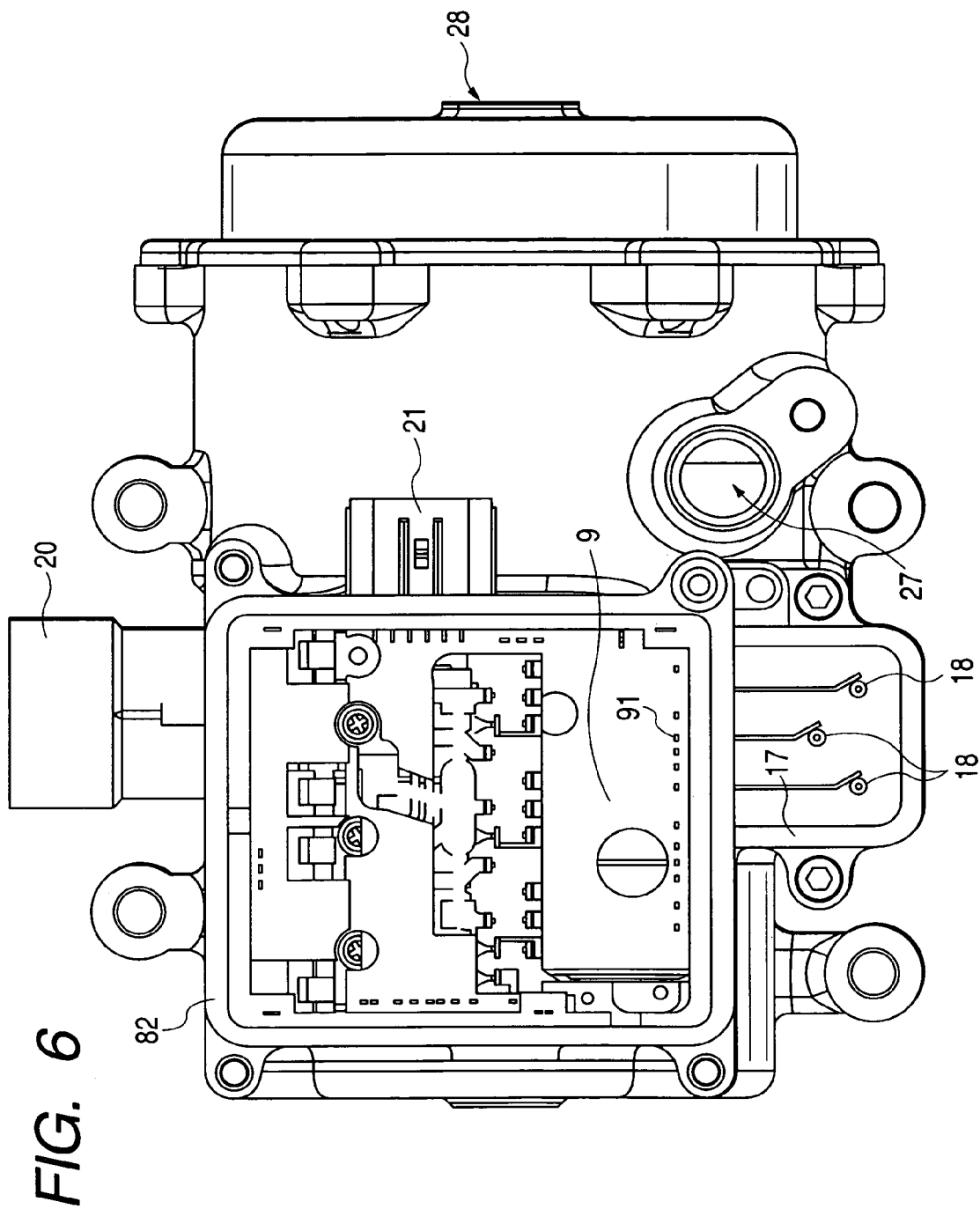
FIG. 6 is a plan view showing a printed circuit board mounted on the inverter-integrated motor-driven compressor in accordance with the first embodiment of the present invention.

FIG. 6 is a plan view of the inverter-integrated motor-driven compressor shown in FIG. 1.

(Overall Arrangement)

A compressor section 1 constitutes part of a refrigerating cycle apparatus for an automotive air-conditioning system. A cylindrical motor section 2 drives the compressor section 1. A compressor housing 3 accommodates a compressor. A motor housing 4 accommodates a three-phase synchronous motor. An inverter section 5, serving as an inverter circuit section of the present invention, drives and controls the motor section 2.

The compressor housing 3 and the motor housing 4, facing each other in the axial direction of their rotary shafts (not shown), are connected coaxially by means of through bolts. The rotary shaft of the motor section 2 is drivingly engaged with the rotary shaft of the compressor section 1. The compressor section 1 and the motor section 2 cooperatively constitute a motor-driven compressor. A mounting base portion 40, protruding upward when seen in FIGS. 1 and 2, is integrally formed on an outer surface of the cylindrical motor housing 4. The top of the mounting base portion 40 is configured into a flat surface extending in the horizontal direction, more specifically along a tangential line or direction of the cylindrical motor section 2, so as to serve as the mounting base surface 41.

The motor section 2 is kept at a low temperature by a low-pressure coolant gas discharged from or introduced into an evaporator (not shown). As shown in FIG. 6, the motor housing 4 has a low-pressure coolant gas inlet port 27 and the compressor housing 3 has a high-pressure coolant gas outlet port 28. The low-pressure coolant gas flows inside the motor housing 4 and cools the motor housing 4.

The inverter section 5 includes six power MOS transistors modules (i.e., power switching elements) 6 for constituting upper arm side switching elements and lower arm side switching elements of respective phases of a three-phase inverter circuit. Furthermore, the inverter section 5 includes a smoothing capacitor 7, a bus-bar integrated plate and outer frame section 8, a printed circuit board 9, and a cover plate 10. The inverter section 5 converts DC power supplied from a battery (not known) into three-phase AC power. The converted three-phase AC power is supplied to stator coils (not shown) of the motor section 2.

To this end, leader lines of respective phases from the motor section 2 are connected to joint points of three power MOS transistor modules 6 serving as upper arm side switching elements and another three power MOS transistor modules 6 serving as lower arm side switching elements of respective phases. The power MOS transistor modules 6 serving as upper arm side switching elements have main electrode terminals connected to a later-described power source terminal. The power MOS transistor modules 6 serving as lower arm side switching elements have main electrode terminals connected to a later-described ground terminal.

Each power MOS transistor module 6, configured into a thick plate shape by resin molding, has three terminals protruding from one side surface thereof. The three terminals are a drain electrode terminal 61 serving as main electrode terminal, a source electrode terminal 62 serving as main electrode terminal, and a gate electrode terminal 63 serving as a control electrode terminal. The power MOS transistor module 6 has a through-hole 64 provided closely to another side surface opposite to the side surface on which the above-described three terminals are provided. Each power MOS transistor module 6 is tightened with or fixed to the motor housing 4 by means of a fastening member inserted into the through-hole 64.

The power MOS transistor modules (i.e., power switching elements) are constituted by discrete transistors each having a side surface from which the electrode terminals protrude and a bottom surface fixed directly or via a radiator plate on an outer surface of a cylindrical wall of the motor housing 4.

The smoothing capacitor 7, interposed between a power source terminal and a ground terminal of the three-phase inverter circuit, absorbs high-frequency components of the switching current of the three-phase inverter circuit.

The bus-bar integrated plate and outer frame section 8, incorporating numerous bus bars serving as a wiring for the three-phase inverter circuit, is fixed on the outer surface of a motor connector section 14. Respective bus bars are integrated by resin insert molding. The bus-bar integrated plate and outer frame section 8 is used for connection between respective power MOS transistor modules 6, for connection from each power MOS transistor module 6 to the printed circuit board 9, for connection from each power MOS transistor module 6 to the smoothing capacitor 7, for connection from each power MOS transistor module 6 to the DC power source terminal and to the ground terminal, and for connection from each power MOS transistor module 6 to an AC terminal.

The control circuit, mounted on the printed circuit board 9, has a function of connecting or disconnecting each power MOS transistor module 6 based on an external command and a function of transmitting or notifying the activating condition of the motor section 2 to an external device. The control circuit includes a microcomputer integrated circuit and various peripheral circuit elements connected via the printed wiring.

This circuit arrangement and its operation of this kind of inverter section 5 are well known and accordingly will not be explained hereinafter. The inverter section 5 has the following characteristics.

(Layout of Inverter Section)

Respective power MOS transistor modules 6 are fixed on the mounting base surface 41 of the mounting base portion 40 via a resin insulation sheet 11 by means of screws 12.

The power MOS transistor modules 6, as shown in FIGS. 3 and 4, are arranged next to each other so as to constitute three rows in the axial direction and two lines in the circumferential direction. The side surfaces of respective power MOS transistor modules 6, from which the above-described electrode terminals protrude, are opposed each other.

Three power MOS transistor modules 6, arrayed in line, cooperatively constitute the upper arm side switching elements. Three remaining power MOS transistor modules 6, also arrayed in line, cooperatively constitute the lower arm side switching elements. Among the power MOS transistor modules 6 constituting the upper arm side switching elements, the power MOS transistor module 6 positioned at one axial end serves as a U-phase switching element. The power MOS transistor module 6 positioned at the axial center serves as a V-phase switching element. The power MOS transistor module 6 positioned at the other axial end serves as a W-phase switching element. Similarly, among the power MOS transistor modules 6 constituting the lower arm side switching elements, the power MOS transistor module 6 positioned at one axial end serves as a U-phase switching element. The power MOS transistor module 6 positioned at the axial center serves as a V-phase switching element. The power MOS transistor module 6 positioned at the other axial end serves as a W-phase switching element.

A wiring region W, having a predetermined width in the circumferential direction, is provided between the three power MOS transistor modules 6 constituting the upper arm side switching elements and the three power MOS transistor modules 6 constituting the lower arm side switching elements. Two power MOS transistor modules 6 of the same phase are arranged in such a manner that a source terminal 62 of the upper arm side power MOS transistor module 6 and a drain terminal 61 of the lower arm side power MOS transistor module 6 are disposed at the same axial position. With this arrangement, the length of a bus bar required to connect these terminals to the AC output terminal portion can be shortened.

The mounting base surface 41 of the mounting base portion 40, formed on the outer side of cylindrical motor housing 4, has a stepped flat portion 42 raised or protruded by a predetermined height in the radial direction compared with the adjacent flat region where the power MOS transistor modules 6 are disposed. The stepped flat portion 42 corresponds to the wiring region W. As shown in FIG. 2, the thickness of the cylindrical wall of the motor housing 4 is smallest at the wiring region W. Providing the stepped portion 42 brings the effect of improving the strength or the rigidity of the motor housing 4. Thickening the cylindrical wall of the motor housing 4 is realized in the following manner. Respective electrode terminals of each power MOS transistor module 6 are positioned at a predetermined height from the bottom surface of the power MOS transistor module 6. The resin insulation sheet 11 is spread on the entire surface of the mounting base portion 40, including the portion facing the wiring region W. Even if the clearance between the electrode terminals of each power MOS transistor module 6 and the motor housing 4 is reduced, a sufficient gap for preventing the creepage discharge can be secured.

The screws 12 are inserted into the through-holes 64 which are provided closely to the outer side surfaces of the power MOS transistors 6 opposed to the inner side surfaces on which the above-described electrode terminals are provided. The screws 12 are tightly anchored onto the mounting base portion 40 so as to fix the power MOS transistors 6 to the mounting base portion 40. As understood from FIG. 2, when measured in the direction normal to the mounting base surface 41, the thickness of the cylindrical wall of the motor housing 4 becomes large with increasing distance from the wiring region W. The position of the through-hole 64 is offset far from the wiring region W. Accordingly, the screw 12 can be inserted deep in the cylindrical wall of the motor housing 4.

The smoothing capacitor 7 is accommodated in a capacitor accommodation hole 13 positioned next to the power MOS transistors 6 in the circumferential direction. The capacitor accommodation hole 13 extends in the direction perpendicular to the mounting base surface 41. A pair of terminals of the smoothing capacitor 7 protrudes upward from the top surface of the smoothing capacitor 7. The capacitor accommodation hole 13 is positioned far from the wiring region W than the power MOS transistors 6. As described above, the thickness of the cylindrical wall of the motor housing 4 measured from the mounting base surface 41 becomes large with increasing distance from the wiring region W. Thus, at this region where the capacitor accommodation hole 13 is formed, the cylindrical wall of the motor housing 4 is sufficiently thick for providing a deep space of the capacitor accommodation hole 13. It becomes possible to suppress excessive protrusion of the terminals of the smoothing capacitor 7 in the up-and-down direction and, accordingly, becomes possible to reduce the protruding height of the inverter portion 5.

A motor connector section 14, is formed at the other circumferential side of the power MOS transistor modules 6, i.e., at the side opposite to the smoothing capacitor 7.

The motor connector section 14, as shown in FIG. 2, includes a cup-shaped connector housing 15, a resin-made cap 16, a resin-made connector cover 17, and an AC terminal 18. The cup-shaped connector housing 15, positioned at the other circumferential side of the mounting base portion 40, protrudes from the outer surface of the cylindrical motor housing 4. The cap 16 closes an upper opening of the connector housing 15. The connector cover 17 is disposed at a higher side of the cap 16. The AC terminal 18 is fixed to the cap 16. Although only one AC terminal 18 is shown in the drawing, a total of three AC terminals 18 are provided. Each AC terminals 18 protrudes into a leader line accommodation space S defined by the connector housing 15 when it is closed by the cap 16. In the leader line accommodation space S, the AC terminals 18 are respectively connected to three leader lines extending from the stator coils of the motor section 2. The leader lines are extracted from the inside of the motor housing 4 into the leader line accommodation space S via a leader line hole 19 provided on the cylindrical wall of the motor housing 4.

The bus-bar integrated plate and outer frame section 8 consists of a bus-bar integrated plate 81 and an outer frame portion 82. The above-described connector cover 17 is integrally formed as part of the outer frame portion 82 by resin molding.

The outer frame portion 82, as shown in FIGS. 1, 4 and 6, is configured into a rectangular frame shape and is chiefly mounted on the mounting base surface 41 and fixed to the mounting base portion 40. The connector cover 17 is formed into a U-shaped configuration and integrally formed at the outer side surface of the outer frame portion 82 so as to surround the AC terminals 18. A power source connector 20 and a communication connector 21, positioned at the other side surface of the outer frame portion 82, protrude in the direction departing from the connector cover 17.

The bus-bar integrated plate 81, positioned above the power MOS transistor modules 6, extends in the horizontal direction from the inner side surface of the outer frame portion 82. The bus-bar integrated plate 81 is parallel to the mounting base surface 41. The bus-bar integrated plate 81 includes numerous bus bars disposed in two layers in the up-and-down direction used for connecting the power MOS transistor modules 6, the printed circuit board 9, and the AC terminals 18. Respective bus bars are integrally molded with a resin molding plate portion 83. A ground (−) terminal 22 and a power source (+) terminal 23 extend from the bus-bar integrated plate 81 and protrude into the power source connector 20. And, in the power source connector 20, the ground (−) terminal 22 and the power source (+) terminal 23 are connected to DC power source cables (not shown). The bus-bar integrated plate 81 has a grounding bus bar with an end portion serving as the ground (−) terminal 22. The grounding bus bar is connected to the source electrode terminals 62 of the power MOS transistor modules 6 constituting the lower arm side switching elements, to a negative electrode terminal of the smoothing capacitor 7, and to a ground wiring pattern of the printed circuit board 9. The power source (+) terminal 23 is connected to the drain electrode terminals 61 of the power MOS transistor modules 6 constituting the upper arm side switching elements, to a positive electrode terminal of the smoothing capacitor 7, and to a power source wiring pattern of the printed circuit board 9.

Communication terminals (not shown) extend from the bus-bar integrated plate 81 and protrude into the communication connector 21. Three-phase AC terminals 24–26 protrude in the horizontal direction from the bus-bar integrated plate 81. The AC terminals 24–26 are brought into contact with the AC terminals 18 of the motor section 2 in the connector cover 17. The terminals, protruding horizontally from the bus-bar integrated plate 81 into the outer frame portion 82, are bent into the up-and-down direction and connected to corresponding electrode terminals of the power MOS transistor modules 6 in the wiring region W. In the drawing, X represents the joint portion of them. Similarly, the terminals protruding upward from the bus-bar integrated plate 81 in the outer frame portion 82 are inserted into through-holes 91 of the printed circuit board 9 and are fixed there by soldering.

The outer peripheral portion of the printed circuit board 9 is placed on a stepped surface 84 provided inside the outer frame portion 82 and is fixed by means of screws. The printed circuit board 9 is positioned above the bus-bar integrated plate 81 with a predetermined gap and extends in parallel with the bus-bar integrated plate 81. The resin molding plate portion 83 of the bus-bar integrated plate 81 has a central support shaft 830 which is brought into contact with a lower surface of the printed circuit board 9 at the horizontal center. The central support shaft 830 has a function of suppressing vibrations of the printed circuit board 9. The circuit components C, including ICs, are mounted on the lower surface of the printed circuit board 9. According to this arrangement, the bus bar terminals protruding upward from the bus-bar integrated plate 81 and passing the through-holes 91 of the printed circuit board 9 can be soldered onto the upper surface of the printed circuit board 9 by jet soldering together with other circuit components.

The cover plate 10 is fixed to a top surface 85 of the outer frame portion 82. The inside of the outer frame portion 82 is filled with gel to improve moistureproofness as well as antivibration properties. A resin mold is provided inside the connector housing 17 for insulating protection of the AC terminals 24 to 26 of the bus-bar integrated plate 81 and the AC terminals 18 of the motor section 2.

According to the above-described embodiment, the above-described gel and the above-described molded resin are simultaneously or separately heated. It is however possible to replace the gel with the molded resin.

(Assembling Order)

Next, the order of assembling the inverter section 5 will be explained.

First, the bus-bar integrated plate and outer frame section 8 and the printed circuit board 9 are assembled by soldering and by means of screws. The power MOS transistor modules 6 are placed on the mounting base portion 40 of the motor housing 4.

Next, the assembly of the bus-bar integrated plate and outer frame section 8 and the printed circuit board 9 is fixed to the motor housing 4, and a bonding tool is inserted from an upper opening of the assembly to connect the electrode terminals of the power MOS transistor modules 6 to the terminal of the smoothing capacitor 7 and to the terminals of the bus-bar integrated plate and outer frame section 8, and also to bring the AC terminals 24–26 of the bus-bar integrated plate and outer frame section 8 into contact with the AC terminals 18 of the motor section 2. Next, the inside space of the outer frame portion 82 is filled with the gel and a liquefied resin is injected into the connector housing 17. The cover plate 10 is fixed on the top surface 85 of the outer frame portion 82. Then, a heat treatment is applied to harden the liquefied resin.

(Effects of the Invention)

The inverter-integrated motor-driven compressor for an automotive vehicle in accordance with the above-described embodiment of the present invention has the following functions and effects.

(1) The power MOS transistor modules 6 of the inverter section are directly fixed on the outer flat surface of the cylindrical wall of the motor housing 4 which is cooled by the low-pressure coolant gas. The power MOS transistor modules 6 are arranged in a predetermined matrix pattern. With this arrangement, it becomes possible to prevent the cooling structure for the inverter section from being complicated. The cooling of the inverter section can be adequately realized. The axial length of the motor can be reduced and accordingly the installability of the motor into a vehicle can be improved. Furthermore, the cylindrical wall of the motor housing 4 can be used as a heat sink for the power MOS transistor modules 6. This makes it possible to realize a compact and light-weight inverter section and reduce the heat-radiation resistance.

(2) The mounting base portion 40 is defined by a flat mounting base surface 41 extending in a tangential direction of the motor section 2 and a cylindrical inner wall of the motor housing 4. The thickness of the mounting base portion 40 continuously changes with increasing circumferential distance. The screw holes 64, into which the screws 12 are inserted to fix the power MOS transistor modules 6, are provided at the portion where the thickness of the mounting base portion 40 is sufficiently large. This arrangement is advantageous in preventing the size and the weight of mounting base portion 40 from increasing as well as in reducing the heat transfer resistance. It becomes possible to connect the mounting base portion 40 to a bottom portion of respective discrete transistors.

(3) Electrode terminals of each power MOS transistor module 6 protrude toward the wiring region W, i.e., the region intervening between three power MOS transistor modules 6 constituting the upper arm side switching elements and another three power MOS transistor modules 6 constituting the lower arm side switching elements. This is advantageous in downsizing the mounting base portion 40. Especially, when two power MOS transistor modules 6 are opposed in the circumferential direction, the thickness (i.e., radial size) of the mounting base portion 40 can be reduced. The overall size of the inverter-integrated motor-driven compressor can be reduced. Furthermore, it is possible to array the joint portions of the electrode terminals of respective discrete transistors on the same flat plane.

(4) Respective power MOS transistors 6 are fixed on the flat mounting base surface 41. This makes it easy to arrange the joint portions of the electrode terminals of respective power MOS transistors 6 on the same flat plane. The workability in the wiring connection work can be improved and the wiring can be automated.

(5) The power MOS transistor modules 6 of different phases are disposed in line in the axial direction. Two power MOS transistor modules 6 of the same phase are opposed to each other in the circumferential direction, with their electrode terminals being opposed in the circumferential direction. The wiring region W for connection to the bus bars is provided for the electrode terminals protruding from the opposed power MOS transistor modules 6. The wiring region W is commonly used for the power MOS transistor modules 6 disposed in the opposed relationship in the circumferential direction. The space or area required for the inverter portion 5 can be reduced. The wiring length of the bus bars can be shortened.

(6) The central region of the mounting base surface 41, positioned just beneath the wiring region W, is raised or protruded as the stepped portion 42 by a predetermined height in the radial direction compared with the adjacent region where the power MOS transistor modules 6 are disposed. This is effective to suppress the height of the inverter section 5. Forming the stepped portion 42 brings the effect of improving the strength or the rigidity of the motor housing 4 at the region where the thickness of the cylindrical wall is smallest.

(7) The power MOS transistor modules 6, the bus-bar integrated plate 81, the printed circuit board 9, and the smoothing capacitor 7 are accommodated in a space defined by the outer flat surface of the cylindrical wall of the motor housing 4, the outer frame portion 82, and the cover plate 10 which is filled with the gel-state resin member. The moistureproofness of the circuit elements can be improved. High density wiring can be realized. Furthermore, the vibrations of the printed circuit board 9 and the bus-bar integrated plate 81 can be adequately reduced.

(8) The resin insulation sheet 11 is spread on the outer flat surface of the cylindrical wall of the motor housing 4, including the region facing to the wiring region W. With this arrangement, the power MOS transistor modules 6, the electrode terminals, and the bus bars are disposed as close as possible to the outer flat surface of the cylindrical wall of the motor housing 4. It is hence possible to suppress the overall height of the inverter section 5.

(9) The smoothing capacitor 7 is accommodated in the accommodation hole 13 which is positioned at one circumferential side of the power MOS transistor modules 6 far from the wiring region W so as to extend in the direction perpendicular to the mounting base surface 41. The thickness of the mounting base portion 40, measured perpendicularly to the mounting base surface 41, is sufficiently large at the region where the accommodation hole 13 is formed. Thus, the capacitor accommodation hole 13 has a sufficient depth. As a result, the smoothing capacitor 7 can be sufficiently cooled by the motor housing 4 which is kept in a low-temperature condition. The height of the terminals of the smoothing capacitor 7 can be set to a value closer to the height of the bus-bar integrated plate 81. The wiring length for the smoothing capacitor 7 can be shortened. Furthermore, the height of the inverter portion 5 can be suppressed. In other words, the smoothing capacitor 7 is disposed next to or adjacent to the assembly of power MOS transistor modules in the circumferential direction. The terminals of the smoothing capacitor 7 extend perpendicularly to the mounting base surface 41 and protrude in the direction departing from the cylindrical wall of the motor housing 4. With this arrangement, it becomes possible to dispose the smoothing capacitor 7 perpendicularly to the mounting base surface 41 and deep in the motor housing 4. The inverter section can be downsized. Furthermore, when the DC power source terminal section is disposed in the same direction as the smoothing capacitor 7, the smoothing capacitor 7 can be disposed between the three-phase inverter circuit and the DC power source section. The overall length of the DC power source wiring connecting them can be shortened. The wiring inductance decreases. The switching surge noise voltage decreases, too.

(10) Furthermore, the AC output terminals of the motor section 2 are located at the other circumferential side of the power MOS transistor modules 6, i.e., at the far side of the power MOS transistor modules 6 opposed to the smoothing capacitor 7. The smoothing capacitor 7 does not interfere with the AC output terminals of the motor section 2. The AC output terminals of the motor section 2 can be located in a wide space. Like the capacitor accommodation hole 13, the motor connector section 14 is sufficiently deep for accommodating the AC output terminals of the motor section 2.

(11) The bus-bar integrated plate 81, incorporating numerous bus bars molded with a resin, is provided above the power MOS transistor modules 6. The bus-bar integrated plate 81 is located at the radial outer side of the power MOS transistor modules 6. This arrangement makes it possible to realize the high-density layout for the bus bars without considering the influence of vibrations caused by the motor-driven compressor and deformation of the bus bars in case of collision. The inverter section 5 can be downsized. Furthermore, the work for positioning each bus bar to a designated position can be accomplished at one time. The wiring work becomes simple. Furthermore, the DC bus bars extending above the power MOS transistor modules 6 can shield the electromagnetic switching noises emitted from the power MOS transistor modules 6.

(12) The printed circuit board 9, provided at the radially outer side of the bus-bar integrated plate 81, extends in parallel with the bus-bar integrated plate 81. This arrangement is advantageous in reducing the wiring amount for the bus-bar integrated plate 81. The bus-bar integrated plate 81 becomes compact in structure and light in weight. The printed circuit board (i.e., low-current wiring) 9, the bus-bar integrated plate (i.e., high-current wiring) 81, and the power MOS transistor modules 6 are stacked to constitute a three-step or triple-deck structure. The wiring distance can be reduced and the inverter section becomes compact. The three-step or triple-deck structure requires a vertical wiring ranging from the printed circuit board 9 to the power MOS transistor modules 6. The bus-bar integrated plate 81 can easily provide such a vertical wiring by bending one end of a bus bar upward and also bending the other end downward. The wiring structure is not complicated. The outer frame portion 82 of the bus-bar integrated plate and outer frame section 8 constitutes the power source connector section surrounding the DC power source terminals. The total number of required parts can be reduced.

(13) The outer frame portion 82, surrounding the power MOS transistor modules 6 and the printed circuit board 9, is integrally resin molded with the bus-bar integrated plate 81. The outer periphery of the bus-bar integrated plate 81 is continuously fixed to the inner surface of the outer frame portion 82. The outer frame portion 82 is capable of securely holding the printed circuit board 9 in a spaced relationship to the bus-bar integrated plate 81 and is also capable of mechanically protecting the power MOS transistor modules 6 and the printed circuit board 9. Furthermore, as the bus-bar integrated plate 81 is integrally formed with outer frame portion 82, the bus-bar integrated plate 81 has excellent anti-vibration properties and mechanical strength durable against vibrations caused by the motor-driven compressor or against an accelerative force in case of the collision of vehicles.

(14) The printed circuit board 9 is fixed on the stepped surface of the outer frame portion 82. The cover plate 10 is fixed on the top surface 85 of the outer frame portion 82. Installation of the printed circuit board 9 is very simple. The work for positioning or adjusting the terminal holes of the printed circuit board 9 to corresponding bus-bar terminals protruding from the bus-bar integrated plate 81 can be accurately performed.

(15) The central support shaft 830, integrally formed with the resin molding plate portion 83, is brought into contact with the lower surface of the printed circuit board 9. The central support shaft 830 suppresses vibrations of the printed circuit board 9. The anti-vibration properties of the printed circuit board 9 can be further improved.

(16) Among numerous bus bars of the bus-bar integrated plate 81, the grounding bus bar serving as a low DC line of the three-phase inverter circuit is fixed to the outer surface of the cylindrical wall of the motor housing 4. Cooling of the power MOS transistor modules 6 can be realized adequately. The ground wiring for the three-phase inverter circuit can be shortened. The electromagnetic shied effect for the power MOS transistor modules 6 can be further enhanced.

(17) Among numerous bus bars of the bus-bar integrated plate 81, the power source bus bar serving as a high DC line of the three-phase inverter circuit is brought into contact with the outer surface of the cylindrical wall of the motor housing 4 via the resin insulation sheet 11. With this arrangement, a required capacity of the smoothing capacitor 7 can be reduced. The smoothing capacitor 7 becomes compact. The grounding bus bar and the power source bus bar are overlapped with a predetermined gap in the thickness direction in the resin molding plate portion 83. This brings the similar effects.

(18) The outer frame portion 82 of the bus-bar integrated plate and outer frame section 8 constitutes the power source connector section surrounding the DC power source terminals. The total number of required parts can be reduced.

(19) The outer frame portion 82 of the bus-bar integrated plate and outer frame section 8 constitutes the communication connector section surrounding the distal ends of communication bus bars serving as communication terminals. The total number of required parts can be reduced.

(20) The outer frame portion 82 of the bus-bar integrated plate and outer frame section 8 constitutes the motor connector section 14 surrounding the AC output terminals. The total number of required parts can be reduced.

(21) The inside space of the outer frame portion 82 is filled with a resin. This improves electrical insulation, moistureproofness, and anti-vibration properties of various joint portions and wiring can be improved. Regarding the resin used in this case, it is possible to use a soft gel-state resin or a hardened resin.

Second Embodiment

Hereinafter, an inverter-integrated motor-driven compressor for an automotive vehicle in accordance with a second embodiment of the present invention will be explained with reference to FIGS. 7 to 10.

Figure 7:
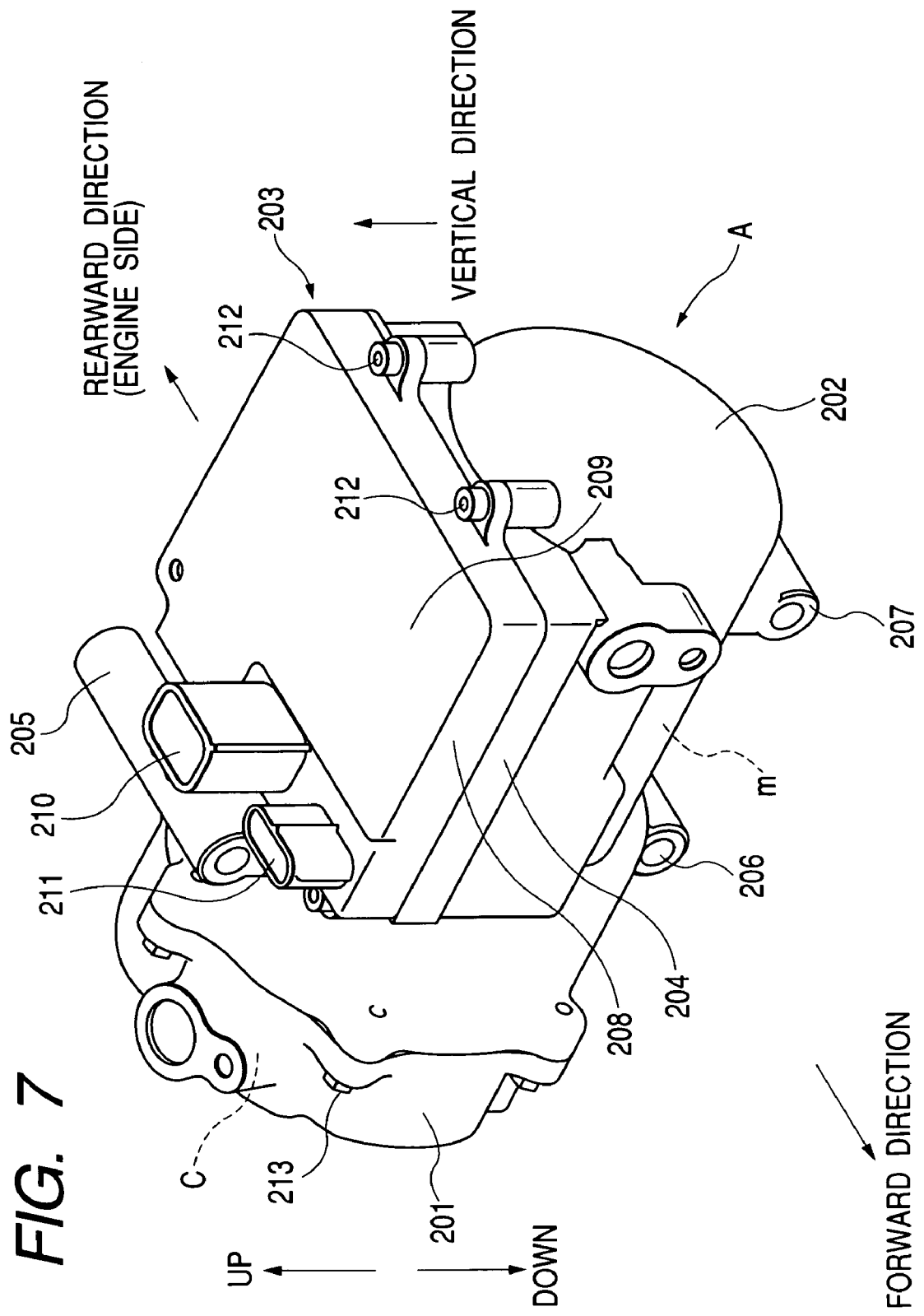
FIG. 7 is a perspective view showing an inverter-integrated motor-driven compressor in accordance with a second embodiment of the present invention.
Figure 8:
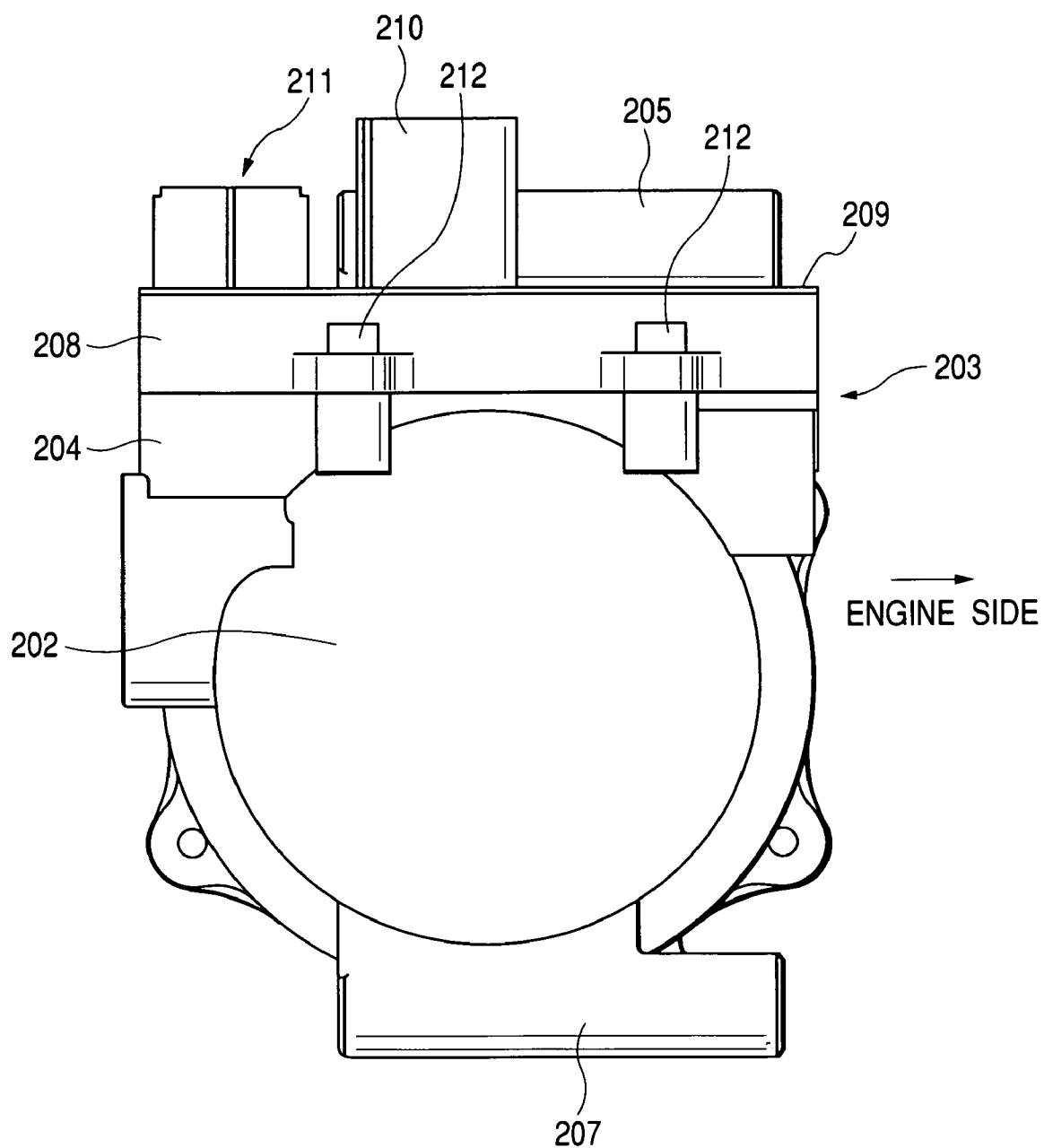
FIG. 8 is a rear view showing the inverter-integrated motor-driven compressor in accordance with the second embodiment of the present invention.
Figure 9:
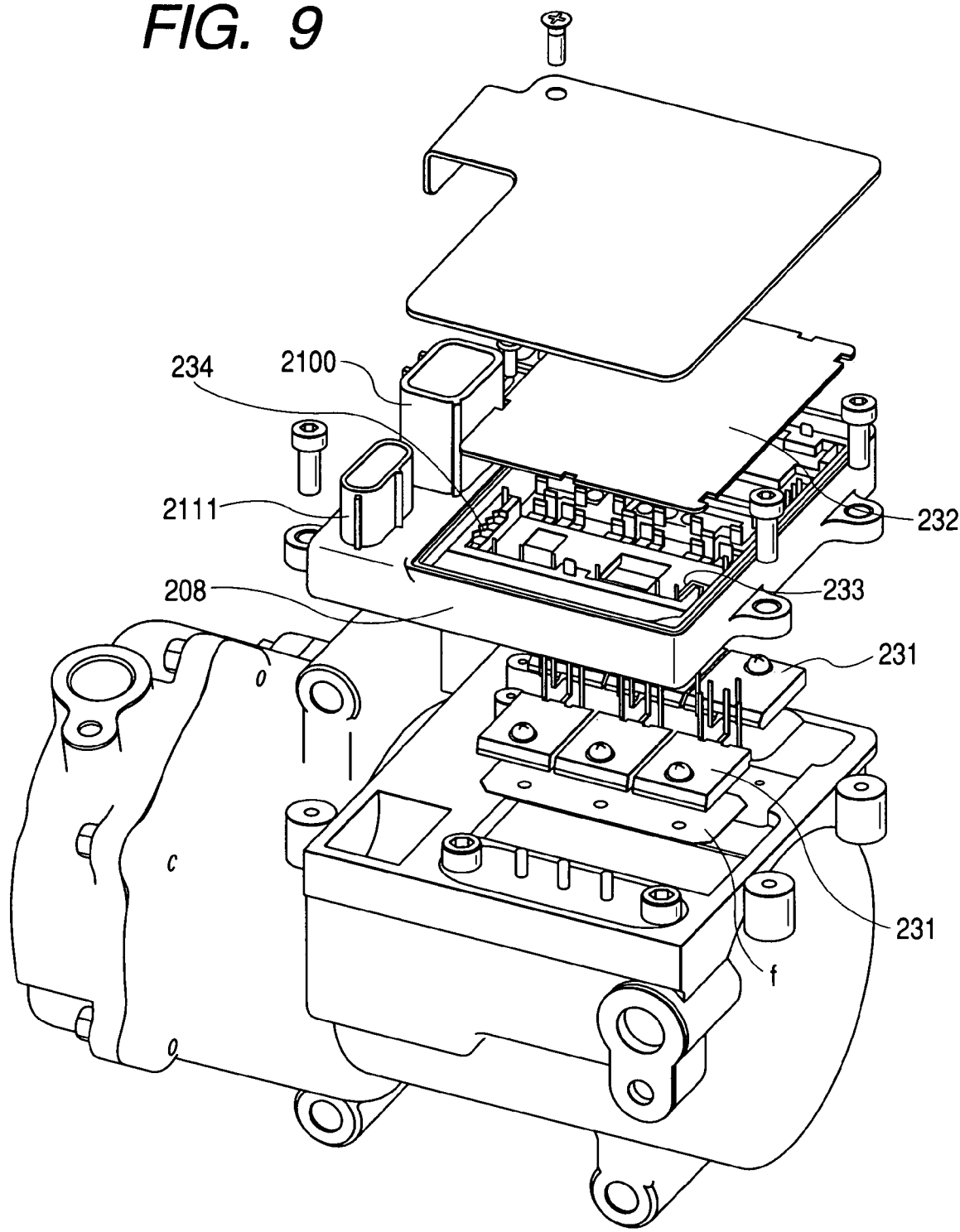
FIG. 9 is an exploded perspective view of the inverter-integrated motor-driven compressor in accordance with the second embodiment of the present invention.

FIG. 7 is a perspective view showing the inverter-integrated motor-driven compressor in accordance with the second embodiment. FIG. 8 is a rear view of the inverter-integrated motor-driven compressor shown in FIG. 7. FIG. 9 is an exploded perspective view of the inverter-integrated motor-driven compressor shown in FIG. 7.

(Overall Arrangement)

A compressor section c constitutes part of a refrigerating cycle apparatus for an automotive air-conditioning system. A compressor housing 201 accommodates a compressor section c. A cylindrical motor section m drives the compressor section c. A motor housing 202 accommodates the motor section m which is a three-phase synchronous motor. A motor control section 203, serving as an inverter circuit section of the present invention, drives and controls the motor section m.

The compressor housing 201 and the motor housing 202, facing each other in the axial direction of their rotary shafts (not shown), are connected coaxially by means of tightening bolts 213. The rotary shaft of the motor section m is drivingly engaged with the rotary shaft of the compressor section c. The compressor section c and the motor section m cooperatively constitute a motor-driven compressor. A mounting base portion 204, overhanging or protruding in the right and left direction, is integrally formed on an outer surface of the cylindrical motor housing 202. The mounting base portion 204, positioned at the top of the motor housing 202, is integrally formed with the motor housing 202 by aluminum die-casting. The mounting base portion 204 is configured into a flat square or rectangular box shape, so as to serve as a base frame portion of an inverter casing. The top of the mounting base portion 204 is configured into a flat surface extending in the horizontal direction, more specifically along a tangential line or direction of the cylindrical motor section m, so as to serve as a mounting base surface. The motor housing 202 is fixedly tightened to an engine block (not shown) by means of bolts tightening bolts inserted into the through holes 205 to 207.

The inverter circuit section 203 is accommodated in the inverter casing consisting of the above-described mounting base portion 204, a resin frame portion 208 placed on the mounting base surface of the mounting base portion 204, and a cover plate 209 covering the upper opening of the resin frame portion 208. A motor power connector 210 and a motor communication connector 211, provided on the upper surface of the resin frame portion 208, extend upright. The motor power connector 210 is used for supplying electric power to the inverter circuit section 203. The motor communication connector 211 provides a communication path for enabling communication between the inverter circuit section 203 and an external electronic device. The resin frame portion 208 is fixed onto the mounting base portion 204 by means of screws 212. The cover plate 209, bonded to the resin frame portion 208 by adhesive, hermetically closes the upper opening of the resin frame portion 208. The inverter circuit section 203 is accommodated in this closed space.

FIG. 9 shows the inverter circuit section 203 in more detail.

The inverter circuit section 203 includes six power MOS transistors modules (i.e., power switching elements) 231 for constituting upper arm side switching elements and lower arm side switching elements of respective phases of a three-phase inverter circuit. Furthermore, the inverter circuit section 203 includes a smoothing capacitor (not shown), a control circuit section 232 for controlling the switching of respective power MOS transistors modules 231. The wiring including numerous bus bars 233 and 234 is integrally manufactured with the resin frame portion 208 by insert molding.

Each power MOS transistor module 231 is fixed on the mounting base portion 204 with an insulation film f interposed therebetween. Output terminals (i.e., main AC electrode terminals) of respective power MOS transistor module 231 are connected to stator coils (not shown) of the motor section m via output cables (not shown). Input terminals (i.e., main DC electrode terminals) of respective power MOS transistor module 231 are connected to the terminals in the motor power connector 210 via the above-described bus bars 233. The control terminals and the detection terminals of respective power MOS transistor module 231 are connected to the control circuit section 232.

The control circuit section 232 is constituted by numerous electronic circuit elements mounted on a printed circuit board. FIG. 9 simply shows the printed circuit board without showing the electronic circuit elements. The printed circuit board is fixed to the resin frame portion 208 by means of screws. The terminals of respective power MOS transistor module 231 and the bus bars protruding from the resin frame portion 208 are inserted into through holes (not shown) opened on the printed circuit board and soldered there.

A resin body portion 2110 of the motor communication connector 211 and a resin body portion 2100 of the motor power connector 210 are integrally formed with a resin frame portion 208. The terminals of the motor communication connector 211 are constituted by end portions of the bus bars 234.

Figure 10:
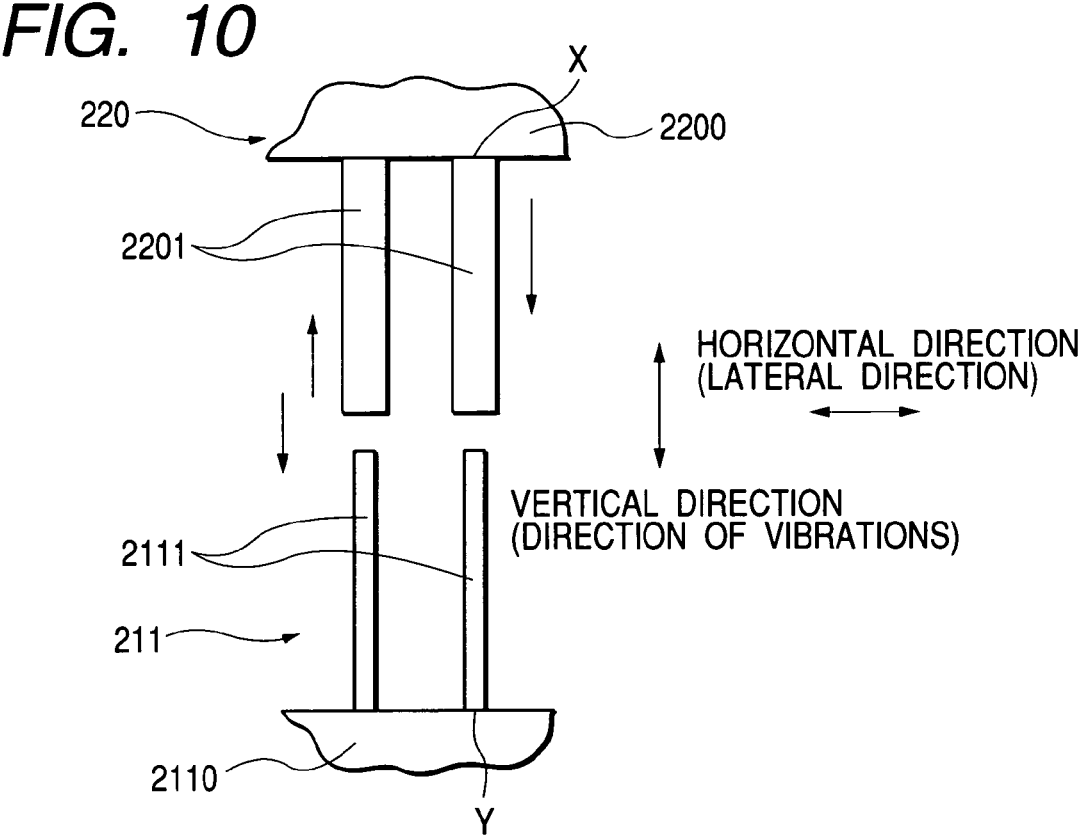
FIG. 10 is a vertical view partly showing connector terminals of the inverter-integrated motor-driven compressor in accordance with the second embodiment of the present invention FIG. 11 a perspective view showing another inverter-integrated motor-driven compressor in accordance with the second embodiment.

FIG. 10 is a vertical view partly showing the motor communication connector 211.

The motor communication connector 211, as described above, has terminals 2111 constituted by end portions of the bus bars 234. The motor communication connector 211 is coupled with a cable communication connector 220. The cable communication connector 220 has terminals 2201 independently brought into contact with the corresponding terminals of the motor communication connector 211. According to this embodiment, each terminal 2201 is configured into a rectangular casing for receiving a corresponding terminal 2111 configured into a rectangular rod.

The cable communication connector 220 is lowered and coupled with the motor communication connector 211. The terminals 2111 of motor communication connector 211 are inserted into the terminals 2201. Similarly, a cable power connector (not shown) is lowered and coupled with the motor power connector 210.

The above-described arrangement brings the following effects.

First of all, the motor power connector 210 and the motor communication connector 211 protrude upward from a top surface of the resin frame portion (i.e., inverter casing) fixed on the upper end portion of the outer cylindrical wall of the motor housing 202. According to this arrangement, the housing and the inverter casing of the motor-driven compressor can prevent the droplet or splash of rain or water, which may contain liquefied salt or harmful components, from reaching the connectors during the traveling of a vehicle. No liquid can enter inside the housing via the coupling portion of the connectors. The electrical insulation of the connectors, especially at joint portions between the terminals of the connectors, can be easily and adequately maintained.

Furthermore, even in the event that the vehicle stays or runs in a pool, a river, a shore, or in the comparable shallow water, it is possible to adequately maintain the electrical insulation of the connectors 210 and 211 against the water because the connectors 210 and 211 are positioned at the highest point of the motor-driven compressor.

Furthermore, as shown in FIG. 10, the terminals 2111 of the motor communication connector 211 and the terminals 2201 of the cable communication connector 2200 extend in the up-and-down direction. This arrangement is advantageous in preventing the terminals from being bent or broken due to vibrations of the vehicle chiefly acting thereon in the up-and-down direction.

More specifically, the terminals 2111 and 2201 are loosely coupled with a certain amount of clearance therebetween. If forces or vibrations acts on these terminals in the lateral direction, the terminals 2111 and 2201 will elastically deform together or by alone. For example, the opposing terminals 2111 and 2201 may elastically deform together with two fulcrums x and y. Or, the opposing terminals 2111 and 2201 may elastically deform independently with the cantilever support at their fulcrums x and y. In this case, if the terminals 2111 and 2201 are disposed in the horizontal direction, the terminals 2111 and 2201 will be directly subjected to the vibratory forces acting in the up-and-down direction during the traveling of the vehicle. The terminals 2111 and 2201 may be bent or broken.

On the other hand, according to the connector arrangement of the above-described second embodiment of the present invention, the terminals 2111 and 2201 extend in the up-and-down direction and will slide along their contacting surfaces without substantially receiving the vibratory forces when they are subjected to the vibratory forces acting in the up-and-down direction. Accordingly, the terminals 2111 and 2201 can be made of thin members. The motor communication connector 211 and the cable communication connector 220 can be downsized.

(Various Modifications of Second Embodiment)

Figure 11:
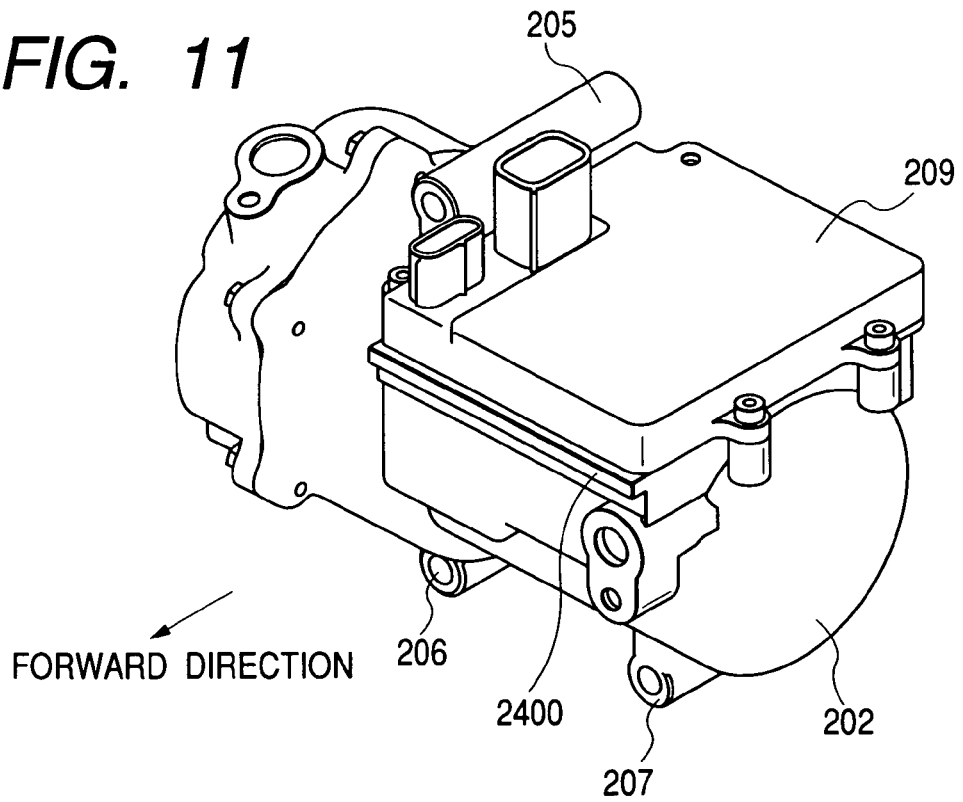
Figure 12:
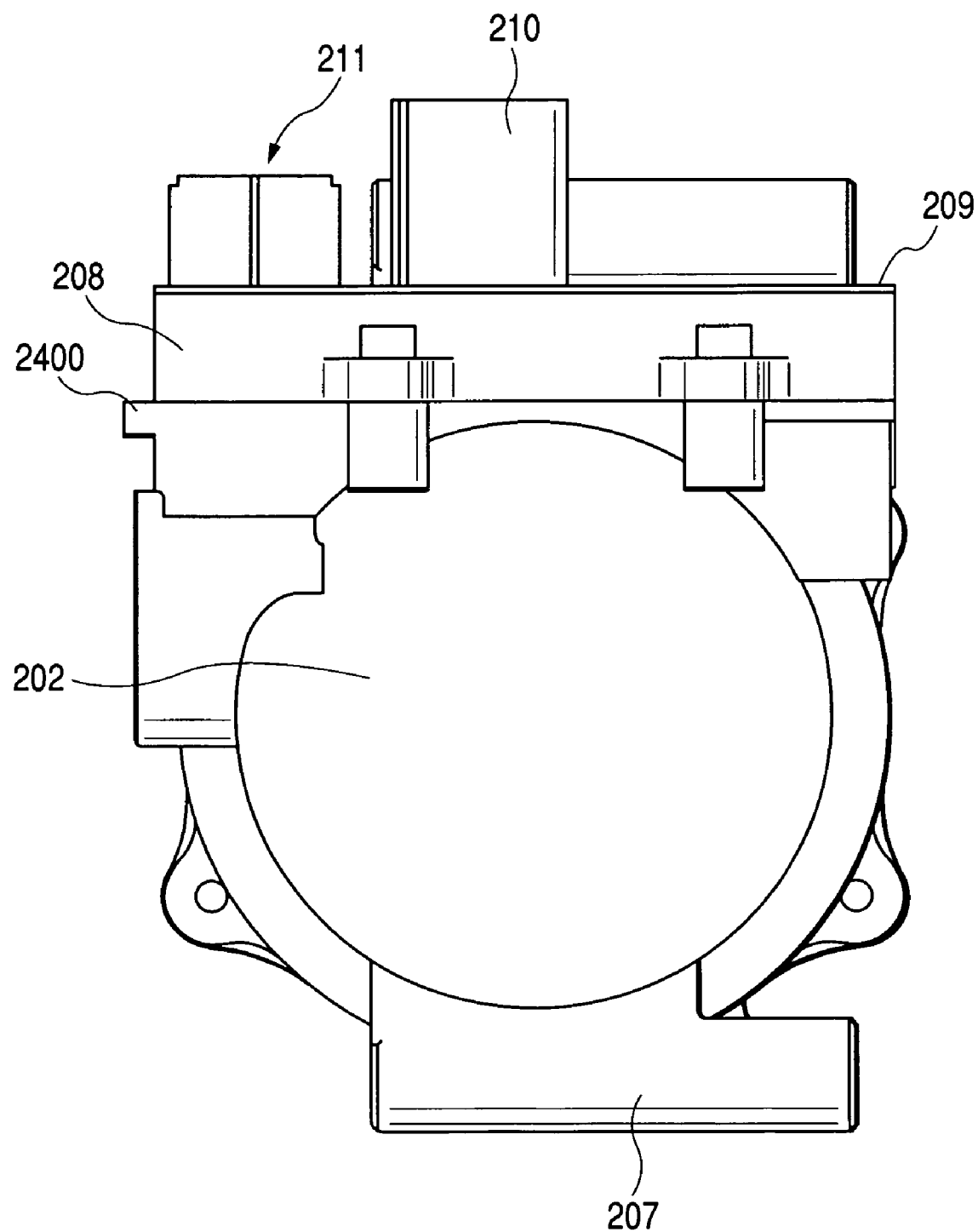
FIG. 12 is a rear view of the inverter-integrated motor-driven compressor shown in FIG. 11.

FIG. 11 a perspective view showing another inverter-integrated motor-driven compressor in accordance with the second embodiment. FIG. 12 is a rear view of the inverter-integrated motor-driven compressor shown in FIG. 11.

According to the inverter-integrated motor-driven compressor shown in FIGS. 11 and 12, an aluminum rib 2400 is provided so as to extend laterally or horizontally on one side surface of the mounting base portion 204 facing in the forward direction of the vehicle. This arrangement brings the effect of safely protecting the inverter circuit section 203 in case of car crash.

Figure 13:
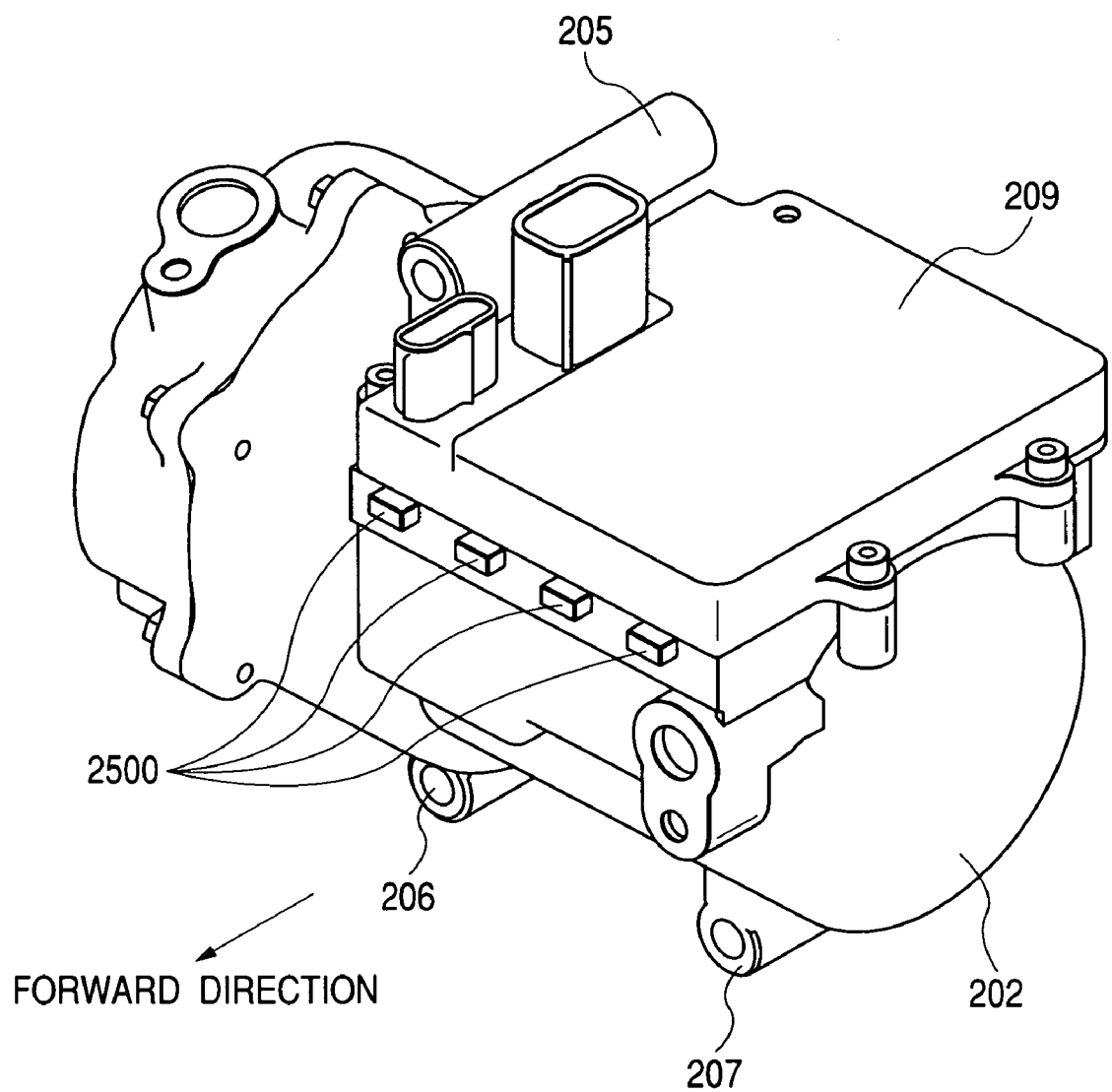
FIG. 13 a perspective view showing another inverter-integrated motor-driven compressor in accordance with the second embodiment.
Figure 14:
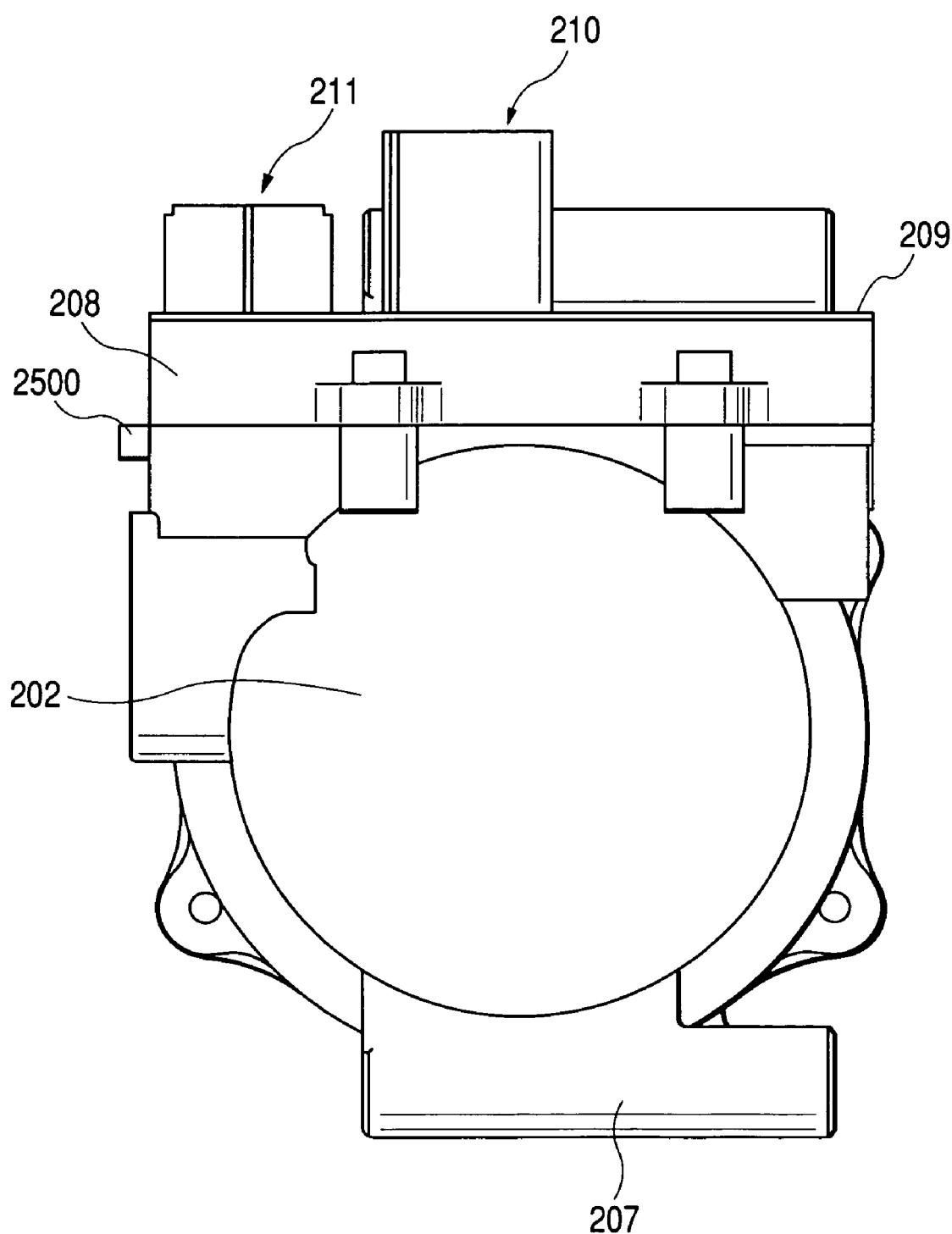
FIG. 14 is a rear view of the inverter-integrated motor-driven compressor shown in FIG. 13.

FIG. 13 a perspective view showing another inverter-integrated motor-driven compressor in accordance with the second embodiment. FIG. 14 is a rear view of the inverter-integrated motor-driven compressor shown in FIG. 13.

According to the inverter-integrated motor-driven compressor shown in FIGS. 13 and 14, four protruding portions 2500 are disposed in line at predetermined intervals. Like the above-described rib 2400, the protruding portions 2500 bring the effect of safely protecting the inverter circuit section 203 in case of car crash.

The above-described rib 2400 and the protruding portions 2500 can be provided on the motor housing 202.

Figure 15:
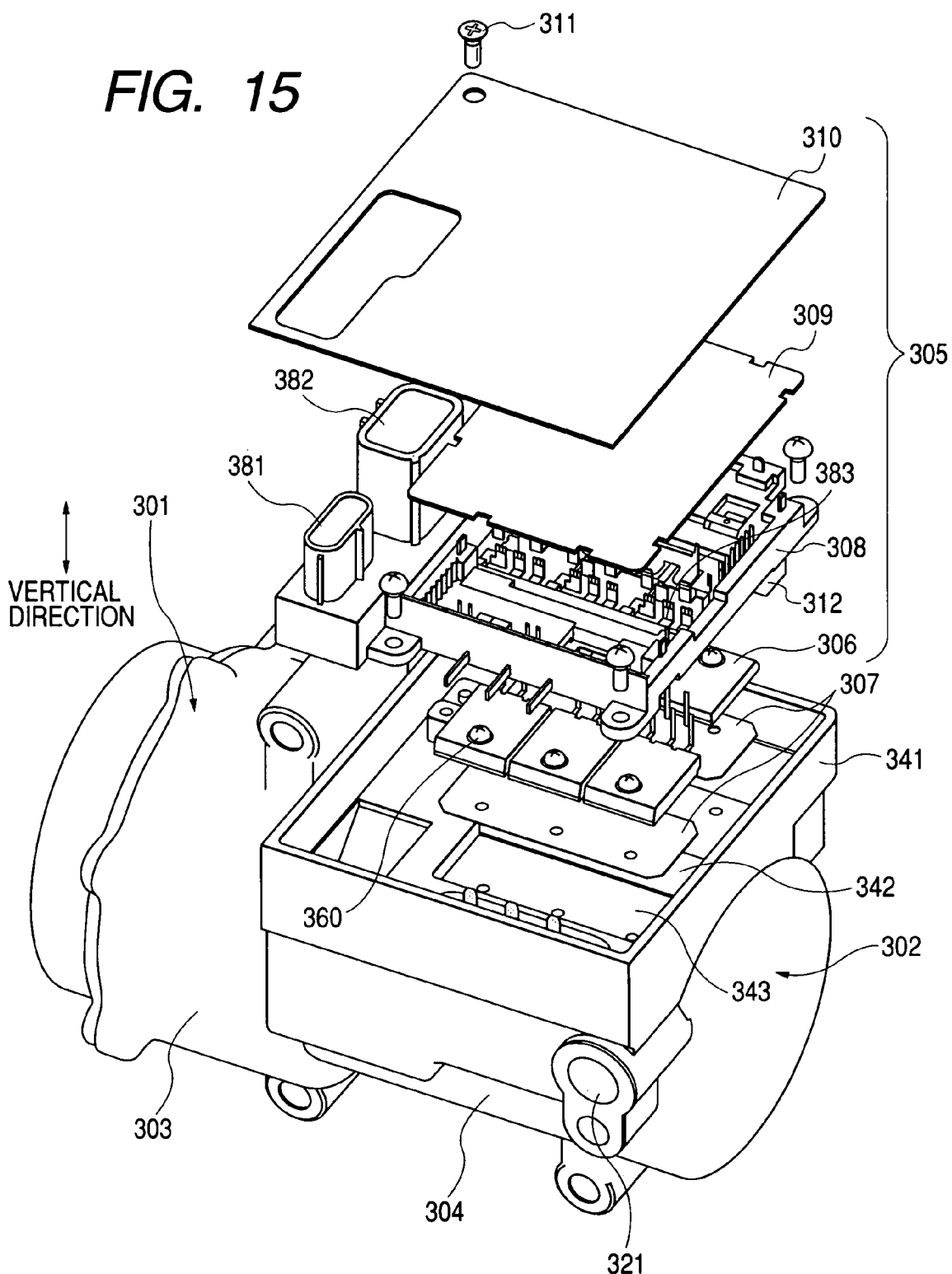
FIG. 15 is an exploded perspective view showing an inverter-integrated motor-driven compressor in accordance with a third embodiment of the present invention.
Figure 16:
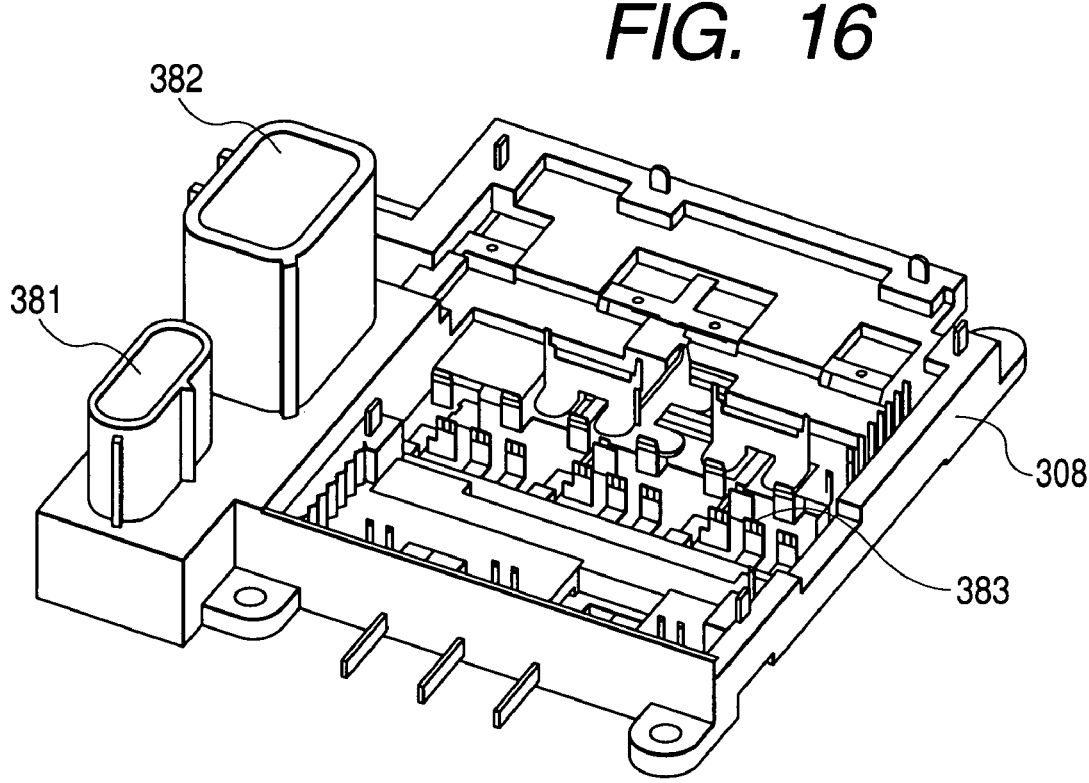
FIG. 16 is a perspective view showing a bus-bar assembly to be incorporated in the inverter-integrated motor-driven compressor in accordance with the third embodiment of the present invention.
Figure 17:
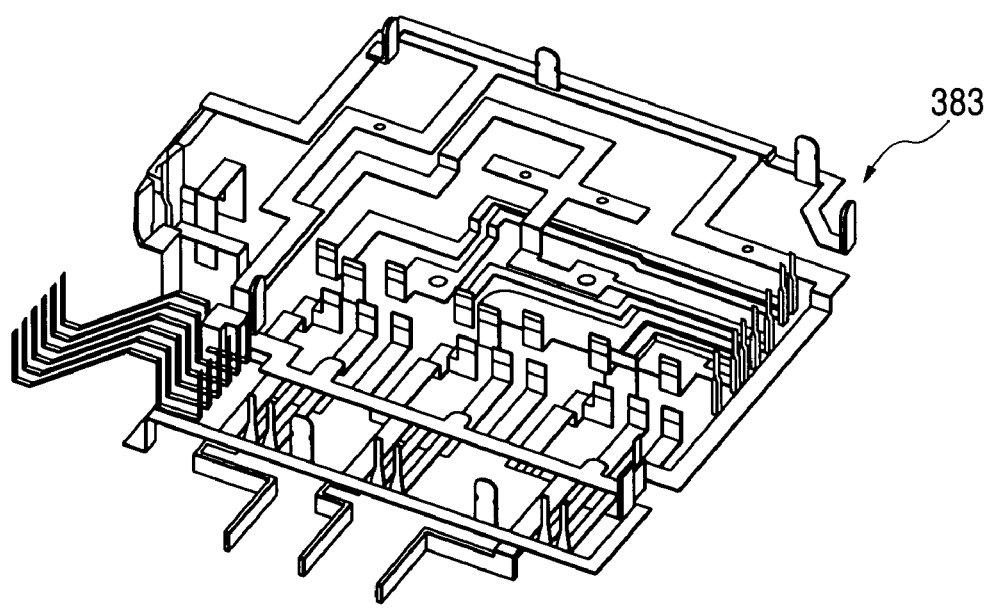
FIG. 17 is a perspective view showing bus bars to be molded in the bus-bar assembly shown in FIG. 16.
Figure 18:
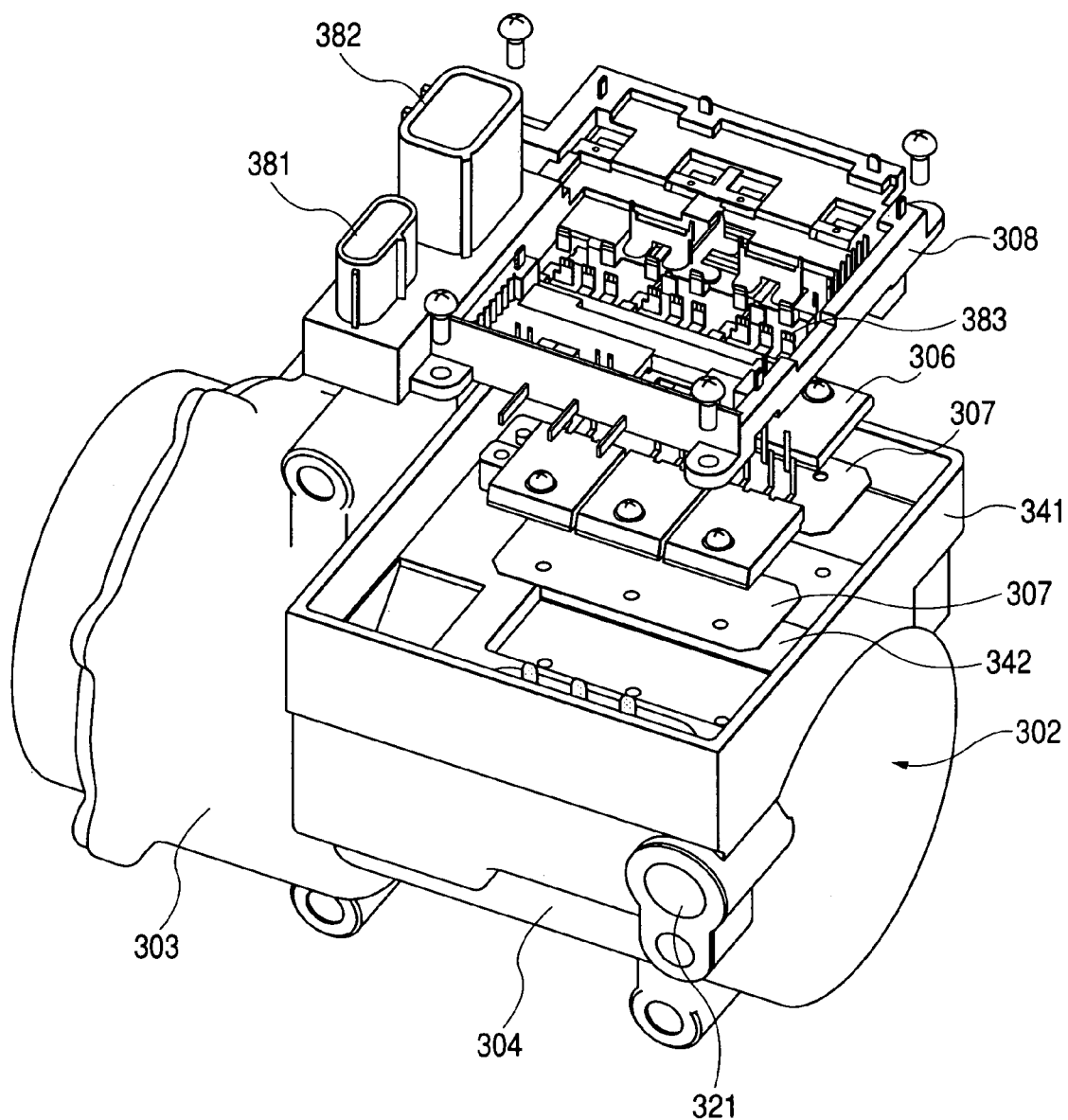
FIG. 18 is an exploded perspective view showing the bus-bar assembly and power switching elements to be assembled together in accordance with the third embodiment of the present invention.

According to the above-described embodiment, the motor-driven compressor is disposed in front of the engine. It is however possible to place the motor-driven compressor at the rear side of the engine. In this case, the above-described rib 2400 and the protruding portions 2500 face the right or left side of the engine room so that the inverter circuit section 203 can be protect in case of side car crash Third Embodiment An inverter-integrated motor-driven compressor of a refrigerating cycle for an automotive vehicle in accordance with a third embodiment of the present invention will be explained with reference to accompanied drawings, although some of constituent members and lines are omitted. FIG. 15 is an exploded perspective view showing the inverter-integrated motor-driven compressor in accordance with the third embodiment of the present invention. FIG. 16 is a perspective view showing a bus-bar assembly to be incorporated in the inverter-integrated motor-driven compressor in accordance with the third embodiment of the present invention. FIG. 17 is a perspective view showing bus bars to be molded in the bus-bar assembly shown in FIG. 16. FIG. 18 is an exploded perspective view showing the bus-bar assembly and power switching elements to be assembled together. FIG. 19 is a plan view showing the inverter-integrated motor-driven compressor shown in FIG. 15, although a cover plate and a printed circuit are removed.

(Overall Arrangement)

A compressor section 301 constitutes part of a refrigerating cycle apparatus for an automotive air-conditioning system. A cylindrical motor section 302 drives the compressor section 301. A compressor housing 303 accommodates a compressor. A motor housing 304 accommodates a three-phase synchronous motor. An inverter circuit section 305 drives and controls the motor section 302. A frame portion 341, integrally formed with the motor housing 304, serves as a housing of the inverter circuit section 305. The compressor housing 303, the motor housing 304, and the frame portion 341 are integrally formed. The compressor housing 303 and the motor housing 304, facing each other in the axial direction of their rotary shafts (not shown), are connected coaxially by means of through bolts. The rotary shaft of the motor section 302 is drivingly engaged with the rotary shaft of the compressor section 301. The compressor section 301 and the motor section 302 cooperatively constitute a motor-driven compressor of the present invention.

The motor section 302 is kept at a low temperature by a low-pressure coolant gas discharged from or introduced into an evaporator (not shown). The motor housing 304 has a low-pressure coolant gas inlet port 321. The compressor housing 303 has a low-pressure coolant gas outlet port 322 (refer to FIG. 19).

The low-pressure coolant gas flows inside the motor housing 304 and cools the motor housing 304. An outer surface of a cylindrical wall of the motor housing 304 is configured into a flat bottom portion 342 of an inverter casing of the present invention. A frame portion 341 surrounds the bottom portion 342. Two flat mounting surfaces 343 are formed on the bottom portion 342.

The inverter circuit section 305 includes six IGBT (i.e., insulated gate bipolar transistor) modules 306, serving as power switching elements of the present invention, for constituting upper arm side switching elements and lower arm side switching elements of respective phases of a three-phase inverter circuit. A heat conductive sheet 307, having insulation properties, is interposed between respective IGBT modules 306 and the mounting surface 343. Furthermore, the inverter circuit section 305 includes a smoothing capacitor 312, a bus-bar assembly 308, a printed circuit board 309 mounting electronic control elements, and a cover plate 310. The inverter circuit section 305 converts DC power supplied from a buttery (not known) into three-phase AC power. The converted three-phase AC power is supplied to stator coils (not shown) of the motor section 302. The cover plate 310, the frame portion 341, and the bottom portion 342 cooperatively constitute the inverter casing for accommodating the inverter circuit section 305.

To this end, leader lines of respective phases from the motor section 302 are connected to joint portions of three IGBT modules 306 serving as upper arm side switching elements and another three IGBT modules 306 serving as lower arm side switching elements of respective phases. The IGBT modules 306 serving as upper arm side switching elements have main electrode terminals connected to a power source terminal of a power source connector 382. The IGBT modules 306 serving as lower arm side switching elements have main electrode terminals connected to a ground terminal of the power source connector 382.

Each IGBT module 306, configured into a thick plate shape by resin molding, has three terminals protruding from one side surface thereof. As shown in FIG. 17, the three terminals are a drain electrode terminal serving as main electrode terminal, a source electrode terminal serving as main electrode terminal, and a gate electrode terminal serving as a control electrode terminal. Each IGBT module 306 has a through-hole provided closely to another side surface opposite to the side surface on which the above-described three terminals are provided. Each IGBT module 306 is tightened with or fixed to the motor housing 304 by means of a screw 360 inserted into the through-hole.

The IGBT modules 306, i.e., the power switching elements, are arranged in a predetermined matrix pattern with three rows aligned in the axial direction and two lines aligned in the circumferential direction of the motor section 302. The inner side surfaces of opposing IGBT modules 306, from which the above-described electrode terminals protrude, face each other in the tangential direction of the motor section 302.

Three IGBT modules 306, aligned at one side in the circumferential direction, cooperatively constitute the upper arm side switching elements. Another three IGBT modules 306, aligned at the other side in the circumferential direction, cooperatively constitute the lower arm side switching elements. Among a group of three IGBT modules 306, the IGBT module 306 positioned at one axial end serves as a U-phase switching element. The IGBT module 306 positioned at the axial center serves as a V-phase switching element. The IGBT module 306 positioned at the other axial end serves as a W-phase switching element.

The smoothing capacitor 312, interposed between a power source terminal and a ground terminal of the three-phase inverter circuit, absorbs high-frequency components of the switching current of the three-phase inverter circuit. The smoothing capacitor 312 is positioned at one circumferential end of these IGBT modules 306 and brought into contact with the outer surface of the cylindrical wall of the motor housing 304.

The mounting surface 343 is configured so as to just fit to the bottom surfaces of the IGBT modules 306 and the smoothing capacitor 312. Thus, the heat generated from the IGBT modules 306 and from the smoothing capacitor 312 can be efficiently transmitted or released to the mounting surface 343.

The bus-bar assembly 308, incorporating numerous bus bars 383 serving as a wiring for the three-phase inverter circuit, is fixed on the bottom portion 342. The bus-bar assembly 308 is used for connection between respective IGBT modules 306, for connection from each IGBT module 306 to the smoothing capacitor 312, for connection from each IGBT module 306 to the printed circuit board 309, for connection from each IGBT module 306 to the power source terminal and to respective AC terminals or to other installed terminals, and for connection between the printed circuit board 309 and communication terminals of an external communication connector 381. The bus-bar assembly 308 is constituted by numerous bus bars 383 which are integrated with a resin molding plate portion by insert molding. The power source connector 382 and the communication connector 381 are provided at one side of the bus-bar assembly 308. The communication connector 381 is used for communication between the printed circuit board 309 and the external device. The power source connector 382 and the communication connector 381 penetrate and protrude outward via an opening of the cover plate 310 and extend vertically from the inverter circuit section 305. The bus-bar assembly 308 is positioned above the IGBT modules 306 and extends in the horizontal direction. Namely, the each connector includes a connector base portion integrally formed with the resin molding plate portion of the bus-bar assembly 308 and penetrating and protruding outward via an opening of the cover plate 310. The connector terminals are integrally formed with the bus bars and supported by the connector base portion.

The printed circuit board 309 includes a control circuit. The control circuit has a function of connecting or disconnecting each IGBT module 306 based on an external command and a function of transmitting or notifying the activating condition of the motor section 302 to an external device. The control circuit includes a microcomputer integrated circuit and various peripheral circuit elements connected via the printed wiring. The printed circuit board 309, spaced from the bus-bar assembly 308 with a predetermined distance in the radial direction, extends in the horizontal direction. The cover plate 310 is fixed to the frame portion 341 by means of a screw 311.

The circuit arrangement and its operation of this kind of inverter circuit section 305 are well known and accordingly will not be explained hereinafter.

(Assembling Order)

Next, the order of assembling the inverter circuit section 305 will be explained.

First, the insulation sheet 307 is spread on the mounting surface 343. The IGBT modules 306 (i.e., power switching elements) are fixed via the insulation sheet 307 on the motor housing 304 by means of screws 360. The bus-bar assembly 308 is accommodated in the frame portion 341. Thereafter, the terminals of respective IGBT modules 306 are welded to the bus bars of the bus-bar assembly 308. Then, the printed circuit board 309 is fixed to the resin molding plate portion of the bus-bar assembly 308. The cover plate 310 is firmly bonded to the frame portion 341.

While the invention has been shown and described in detail, the foregoing description is in all aspects illustrative and not restrictive. It is therefore understood that numerous other modifications and variations can be devised without departing from the scope of the invention.

What is claimed is:

1. An inverter-integrated motor-driven compressor for an automotive vehicle, comprising:
    a compressor section constituting part of a refrigerating cycle apparatus;
    a motor section integrally connected to said compressor section for driving said compressor section;
    a housing for accommodating said compressor section and said motor section; and
    an inverter circuit section including a predetermined number of power switching elements for converting direct-current power into three-phase alternating-current power and supplying the converted alternating-current power to said motor section,
    wherein said motor section is cooled by a low-pressure coolant gas,
    said power switching elements are constituted by discrete transistors corresponding to each of phases, each discrete transistor having a side surface from which electrode terminals of the discrete transitor protrude and a flat bottom surface directly placed on an outer surface of a wall of said housing at a portion surrounding said motor section,
    the wall of the housing has both a mounting base portion having a flat mounting base surface and a stepped flat portion protruded along a radial direction of the motor section so as to be raised from the flat mounting base surface toward an outer side of the motor section, the flat bottom surfaces of the discrete transistors being fixedly placed on the flat mounting base surface of the mounting base portion,
    each of groups of discrete transistors have mutually different phases and are disposed in a line along an axial direction of the motor section,
    two discrete transistors corresponding to each of the phases are disposed adjacent to each other along a circumferential direction of the motor section through a wiring region in which the electrode terminals of one discrete transistor face the electrode terminals of the other discrete transistor, and
    the wiring region is placed on the stepped flat portion of the wall of the housing.

2. The inverter-integrated motor-driven compressor for an automotive vehicle in accordance with claim 1, wherein
    said discrete transistors are anchored into screw holes formed on said wall of said housing, said screw holes extending perpendicularly to said mounting base surface and being offset in the circumferential direction toward a thicker wall region of said housing within said mounting base surface.

3. The inverter-integrated motor-driven compressor for an automotive vehicle in accordance with claim 2, wherein said electrode terminals of said discrete transistors protrude in the circumferential direction toward a thinner wall region of said housing within said mounting base surface.

4. The inverter-integrated motor-driven compressor for an automotive vehicle in accordance with claim 3, wherein said discrete transistors are placed on the same plane constituted by said mounting base surface.

5. The inverter-integrated motor-driven compressor for an automotive vehicle in accordance with claim 4, wherein said discrete transistors are accommodated in a space defined by an outer frame portion brought into contact with said outer surface of said wall of said housing, and said space for accommodating said discrete transistors is filled with a resin member.

6. The inverter-integrated motor-driven compressor for an automotive vehicle in accordance with claim 4, wherein a resin insulation sheet is disposed on said outer surface of the wall of said housing at a region facing to said wiring region.

7. The inverter-integrated motor-driven compressor for an automotive vehicle in accordance with claim 4, wherein a smoothing capacitor is provided at a circumferential end of said power switching elements with said wiring region disposed at an opposite side.

8. The inverter-integrated motor-driven compressor for an automotive vehicle in accordance with claim 7, wherein an alternating-current output terminal section is provided at another circumferential end of said power switching elements far from said smoothing capacitor.

9. An inverter-integrated motor-driven compressor for an automotive vehicle, comprising:
a compressor section constituting part of a refrigerating cycle apparatus;
a motor section integrally connected to said compressor section for driving said compressor section;
a housing for accommodating said compressor section and said motor section;
an inverter circuit section including a predetermined number of power switching elements for converting direct-current power into multi-phase alternating-current power and supplying the converted alternating-current power to said motor section;
an inverter casing fixed on an upper end portion of an outer cylindrical wall of said housing for accommodating said inverter circuit section;
a motor power connector being detachably connected to a cable power connector of a power cable supplying electric power to said inverter circuit section; and
a motor communication connector being detachably connected to a cable communication connector of a communication cable constituting a communication path between said inverter circuit section and an external electronic device,
wherein said motor power connector and said motor communication connector protrude upward from a top surface of said inverter casing fixed on the upper end portion of the outer cylindrical wall of said housing.

10. The inverter-integrated motor-driven compressor for an automotive vehicle in accordance with claim 9, wherein
said inverter circuit section comprises said power switching elements fixed on the outer cylindrical wall of said housing, a control circuit section disposed above said power switching elements and including a printed circuit board mounting electronic circuit elements for controlling said power switching elements, and bus bars connecting said motor power connector and said motor communication connector to said power switching elements or to said control circuit section,
said inverter casing comprises a metallic base frame portion integrally formed with said outer cylindrical wall of said housing and opening upward so as to surround said power switching elements, a resin frame portion fixed to said base frame portion and opening upward so as to surround said printed circuit board of said control circuit section, and a cover plate closing the upper opening of said resin frame portion, and
said motor power connector and said motor communication connector comprises connecting terminals constituted by distal ends of said bus bars and extending vertically and a resin body portion integrally formed with said resin frame portion so as to be coupled with said cable power connector and said cable communication connector inserted or removed in a vertical direction.

11. The inverter-integrated motor-driven compressor for an automotive vehicle in accordance with claim 10, wherein
said housing or said base frame portion comprises at least one protruding portion protruding laterally from said resin frame portion in a direction perpendicular to an axis of said motor-driven compressor.

12. An inverter-integrated motor-driven compressor for an automotive vehicle, comprising a housing, a motor-driven compressor accommodated in said housing, and an inverter circuit section fixed to said housing for converting direct-current power into multi-phase alternating-current power and supplying the converted alternating-current power to said motor-driven compressor,
wherein said inverter circuit section comprises power switching elements constituting respective arms of a multi-phase inverter circuit, a smoothing capacitor connected between a pair of direct-current input terminals of said multi-phase inverter circuit, a control circuit for controlling said power switching elements, and a wiring section for connecting said power switching elements, said smoothing capacitor, and said control circuit,
an inverter casing for accommodating said inverter circuit section is constituted by a metallic frame portion surrounding said inverter circuit section and protruding from an outer cylindrical surface of said housing, a cover plate closing an upper opening of said frame portion, and a cylindrical wall of said housing,
said power switching elements and said smoothing capacitor are placed on a mounting surface formed on the outer cylindrical surface of said housing and surrounded by said frame portion,
said wiring section comprises a bus-bar assembly and a printed circuit board,
said bus-bar assembly includes numerous bus bars integrally molded into a resin molding plate portion so as to assure mutual electrical insulation, and said bus-bar assembly is fixed to the outer cylindrical surface of said housing or to said frame portion via said resin molding plate portion and disposed at a radial outer side of said power switching elements so as to extend in a tangential direction of said motor-drive compressor, and
said printed circuit board is interposed between said bus-bar assembly and said cover plate so as to extend in parallel with said bus-bar assembly for mounting said control circuit.

13. The inverter-integrated motor-driven compressor for an automotive vehicle in accordance with claim 12, wherein
said bus-bar assembly comprises a connector protruding out of said frame portion or said cover plate for communications or power supply,
said connector comprises a connector base portion integrally formed with said resin molding plate portion of said bus-bar assembly and penetrating and protruding outward via an opening of said cover plate, and
connector terminals integrally formed with said bus bars and supported by said connector base portion.

14. The inverter-integrated motor-driven compressor for an automotive vehicle in accordance with claim 1, wherein the outer surface of the wall of the housing has a first area and a second area facing the first area, the first area is nearer to a center of the motor section than the second area, the wall of the housing is configured to position the second area between the center of the motor section and a first line which passes through a point of the first area and is perpendicular to a second line passing through the point of the first area and the center of the motor section, and the discrete transistors are separately placed only on the second area.

15. The inverter-integrated motor-driven compressor for an automotive vehicle in accordance with claim 14, wherein the motor section is configured in a cylindrical shape, the first area extends along a center axis of the motor section, and the second area has two divided areas facing each other through the first area.

16. The inverter-integrated motor-driven compressor for an automotive vehicle in accordance with claim 14, wherein a thickness of the wall in the first area is set at a predetermined value, and a thickness of the wall at the second area is equal to or larger than that in the first area.

17. The inverter-integrated motor-driven compressor for an automotive vehicle in accordance with claim 9, wherein a wall of the housing comprises a mounting base portion having a flat mounting base surface and a stepped flat portion protruded along a radial direction of the motor section so as to be raised from the flat mounting base surface toward an outer side of the motor section;
- each of the power switching elements has both a side surface from which an electrode terminal of the power switching element protrudes and a flat bottom surface directly placed on the flat mounting base surface of the mounting base portion,
- the power switching elements are divided in two groups, each group of power switching elements being disposed in a line along an axial direction of the motor section such that the groups face each other along a circumferential direction of the motor section through a wiring region in which the electrode terminals of the power switching elements are placed, and
- the wiring region is placed on the stepped flat portion of the wall of the housing.

18. The inverter-integrated motor-driven compressor for an automotive vehicle in accordance with claim 12, wherein a wall of the housing comprises a mounting base portion having a flat mounting base surface and a stepped flat portion protruded along a radial direction of the motor-driven compressor so as to be raised from the flat mounting base surface toward an outer side of the motor-driven compressor;
- each of the power switching elements has both a side surface from which an electrode terminal of the power switching element protrudes and a flat bottom surface directly placed on the flat mounting base surface of the mounting base portion,
- the power switching elements are divided in two groups, each group of power switching elements being disposed in a line along an axial direction of the motor-driven compressor such that the groups face each other along a circumferential direction of the motor-driven compressor through a wiring region in which the electrode terminals of the power switching elements are placed, and
- the wiring region is placed on the stepped flat portion of the wall of the housing.

* * * * *